(12) United States Patent
Coffey et al.

(10) Patent No.: US 11,171,980 B2
(45) Date of Patent: Nov. 9, 2021

(54) CONTAGION RISK DETECTION, ANALYSIS AND PROTECTION

(71) Applicant: Forcepoint, LLC, Austin, TX (US)

(72) Inventors: David Coffey, Austin, TX (US);
Richard A. Ford, Austin, TX (US);
Ann Irvine, Baltimore, MD (US);
Kristin Machacek Leary, Austin, TX (US)

(73) Assignee: Forcepoint LLC, Austin, TX (US)

( * ) Notice: Subject to any disclaimer, the term of this patent is extended or adjusted under 35 U.S.C. 154(b) by 379 days.

(21) Appl. No.: 16/179,062

(22) Filed: Nov. 2, 2018

(65) Prior Publication Data

US 2020/0145447 A1  May 7, 2020

(51) Int. Cl.
*G06F 21/00* (2013.01)
*H04L 29/06* (2006.01)
*G06Q 10/06* (2012.01)

(52) U.S. Cl.
CPC ..... *H04L 63/1433* (2013.01); *G06Q 10/0635* (2013.01); *H04L 63/1425* (2013.01)

(58) Field of Classification Search
CPC ............. H04L 63/1433; H04L 63/1425; H04L 63/102; G06Q 10/0635
See application file for complete search history.

(56) References Cited

U.S. PATENT DOCUMENTS

| | | |
|---|---|---|
| 6,072,875 A | 6/2000 | Tsudik |
| 6,678,693 B1 | 1/2004 | Shiraishi |
| 7,107,447 B2 | 9/2006 | Sanin et al. |
| 7,574,740 B1 | 8/2009 | Kennis |
| 7,694,150 B1 | 4/2010 | Kirby |

(Continued)

FOREIGN PATENT DOCUMENTS

| | | |
|---|---|---|
| WO | 2019153581 A1 | 8/2019 |
| WO | WO-2019153581 A1 | 8/2019 |

OTHER PUBLICATIONS

Sanjeev Goyal, Adrien Vigier, Attack, Defence, and Contagion in Networks, The Review of Economic Studies, vol. 81, Issue 4, Oct. 2014, pp. 1518-1542, https://doi.org/10.1093/restud/rdu013 (Year: 2014).*

(Continued)

*Primary Examiner* — Kendall Dolly
(74) *Attorney, Agent, or Firm* — Terrile, Cannatti & Chambers; Michael Rocco Cannatti

(57) ABSTRACT

A method, system, and computer-usable medium for protecting against contagion-based risk events are disclosed for monitoring behavior of users to construct a contagion network relationship map of connection and influence relationships between different users and then analyzing a received stream of events from the users to identify a critical event performed by a first user having a first risk score so that one or more propagated risk scores can be generated from the first risk score for at least a first connected user based on connection and influence relationships between the first user and the first connected user that are extracted from the contagion network relationship so that an adaptive response may be automatically generated to protect and control against actions by at least the first connected user based on the one or more propagated risk scores.

18 Claims, 6 Drawing Sheets

(56) References Cited

U.S. PATENT DOCUMENTS

| | | |
|---|---|---|
| 7,725,565 B2 | 5/2010 | Li et al. |
| 7,813,944 B1 | 10/2010 | Luk et al. |
| 7,882,538 B1 | 2/2011 | Palmer |
| 7,933,960 B2 | 4/2011 | Chen et al. |
| 8,181,253 B1 | 5/2012 | Zaitsev et al. |
| 8,230,505 B1 | 7/2012 | Ahrens et al. |
| 8,312,064 B1 | 11/2012 | Gauvin |
| 8,424,061 B2 | 4/2013 | Rosenoer |
| 8,484,066 B2 | 7/2013 | Miller et al. |
| 8,490,163 B1 | 7/2013 | Harsell et al. |
| 8,713,633 B2 | 4/2014 | Thomas |
| 8,776,168 B1 | 7/2014 | Gibson et al. |
| 8,826,443 B1 | 9/2014 | Raman et al. |
| 8,892,690 B2 | 11/2014 | Liu et al. |
| 8,990,930 B2 | 3/2015 | Burrell et al. |
| 9,015,812 B2 | 4/2015 | Plattner et al. |
| 9,015,847 B1 | 4/2015 | Kaplan et al. |
| 9,043,905 B1 | 5/2015 | Allen et al. |
| 9,128,995 B1 | 9/2015 | Fletcher et al. |
| 9,137,318 B2 | 9/2015 | Hong |
| 9,166,999 B1 | 10/2015 | Kulkarni et al. |
| 9,223,972 B1 | 12/2015 | Vincent et al. |
| 9,246,941 B1 | 1/2016 | Gibson et al. |
| 9,262,722 B1 | 2/2016 | Daniel |
| 9,342,553 B1 | 5/2016 | Fuller |
| 9,485,266 B2 | 11/2016 | Baxley et al. |
| 9,542,650 B2 | 1/2017 | Lospinoso et al. |
| 9,596,146 B2 | 3/2017 | Coates et al. |
| 9,665,854 B1 | 5/2017 | Burger et al. |
| 9,692,762 B2 | 6/2017 | Barkan et al. |
| 9,755,913 B2 | 9/2017 | Bhide et al. |
| 9,762,582 B1 | 9/2017 | Hockings et al. |
| 9,798,883 B1 | 10/2017 | Gil et al. |
| 9,935,891 B1 | 4/2018 | Stamos |
| 9,977,824 B2 | 5/2018 | Agarwal et al. |
| 10,096,065 B2 | 10/2018 | Little |
| 10,187,369 B2 | 1/2019 | Caldera et al. |
| 10,237,298 B1 | 3/2019 | Nguyen et al. |
| 10,270,794 B1 | 4/2019 | Mukerji et al. |
| 10,275,671 B1 | 4/2019 | Newman |
| 10,282,702 B2 | 5/2019 | Paltenghe et al. |
| 10,284,601 B1 | 5/2019 | Bar-Menachem et al. |
| 10,320,813 B1 | 6/2019 | Ahmed et al. |
| 10,341,391 B1 | 7/2019 | Pandey et al. |
| 10,417,454 B1 | 9/2019 | Marom et al. |
| 10,417,653 B2 | 9/2019 | Milton et al. |
| 10,419,428 B2 | 9/2019 | Tunnell et al. |
| 10,432,669 B1 | 10/2019 | Badhwar et al. |
| 10,545,738 B1 | 1/2020 | Jaeger et al. |
| 10,579,281 B2 | 3/2020 | Cherubini et al. |
| 10,917,319 B2 | 2/2021 | Scheib et al. |
| 2002/0078382 A1 | 6/2002 | Sheikh et al. |
| 2002/0112015 A1 | 8/2002 | Haynes |
| 2002/0123865 A1 | 9/2002 | Whitney et al. |
| 2003/0145225 A1 | 7/2003 | Bruton et al. |
| 2003/0145226 A1 | 7/2003 | Bruton et al. |
| 2003/0188189 A1 | 10/2003 | Desai et al. |
| 2004/0034582 A1 | 2/2004 | Gilliam et al. |
| 2004/0044613 A1 | 3/2004 | Murakami et al. |
| 2005/0120025 A1 | 6/2005 | Rodriguez et al. |
| 2005/0138402 A1 | 6/2005 | Yoon et al. |
| 2005/0198099 A1 | 9/2005 | Motsinger et al. |
| 2005/0273850 A1 | 12/2005 | Freund |
| 2006/0048209 A1 | 3/2006 | Shelest et al. |
| 2006/0053476 A1 | 3/2006 | Bezilla et al. |
| 2006/0085543 A1 | 4/2006 | Hrastar et al. |
| 2006/0112111 A1 | 5/2006 | Tseng et al. |
| 2006/0117172 A1 | 6/2006 | Zhang et al. |
| 2006/0129382 A1 | 6/2006 | Anand et al. |
| 2006/0195905 A1 | 8/2006 | Fudge |
| 2006/0206449 A1 | 9/2006 | Fletcher et al. |
| 2006/0225124 A1 | 10/2006 | Kolawa et al. |
| 2007/0043703 A1 | 2/2007 | Bhattacharya et al. |
| 2007/0121522 A1 | 5/2007 | Carter |
| 2007/0225995 A1 | 9/2007 | Moore |
| 2007/0234409 A1 | 10/2007 | Eisen |
| 2008/0082722 A1 | 4/2008 | Savagaonkar et al. |
| 2008/0168002 A1 | 7/2008 | Kagarlis et al. |
| 2008/0168135 A1 | 7/2008 | Redlich et al. |
| 2008/0168453 A1 | 7/2008 | Hutson et al. |
| 2008/0198453 A1 | 8/2008 | LaFontaine et al. |
| 2008/0244741 A1 | 10/2008 | Gustafson et al. |
| 2009/0006888 A1 | 1/2009 | Bernhard et al. |
| 2009/0182872 A1 | 7/2009 | Hong |
| 2009/0228474 A1 | 9/2009 | Chiu et al. |
| 2009/0249466 A1 | 10/2009 | Motil et al. |
| 2009/0254572 A1 | 10/2009 | Redlich et al. |
| 2009/0300712 A1 | 12/2009 | Kaufmann et al. |
| 2010/0010968 A1 | 1/2010 | Redlich et al. |
| 2010/0057662 A1 | 3/2010 | Collier et al. |
| 2010/0058016 A1 | 3/2010 | Nikara et al. |
| 2010/0094767 A1 | 4/2010 | Miltonberger |
| 2010/0094818 A1 | 4/2010 | Farrell et al. |
| 2010/0107255 A1 | 4/2010 | Eiland et al. |
| 2010/0146622 A1 | 6/2010 | Nordstrom et al. |
| 2010/0275263 A1 | 10/2010 | Bennett et al. |
| 2011/0061093 A1 | 3/2011 | Korkus et al. |
| 2011/0167105 A1 | 7/2011 | Ramakrishnan et al. |
| 2011/0307957 A1 | 12/2011 | Barcelo et al. |
| 2012/0046989 A1 | 2/2012 | Baikalov et al. |
| 2012/0047575 A1 | 2/2012 | Baikalov et al. |
| 2012/0079107 A1 | 3/2012 | Williams et al. |
| 2012/0110087 A1 | 5/2012 | Culver et al. |
| 2012/0137367 A1* | 5/2012 | Dupont .................. G06F 21/00 726/25 |
| 2012/0210158 A1 | 8/2012 | Akiyama et al. |
| 2012/0259807 A1 | 10/2012 | Dymetman |
| 2013/0013550 A1 | 1/2013 | Kerby |
| 2013/0054433 A1 | 2/2013 | Giard et al. |
| 2013/0055367 A1 | 2/2013 | Kshirsagar et al. |
| 2013/0080641 A1 | 3/2013 | Lui et al. |
| 2013/0081141 A1 | 3/2013 | Anurag |
| 2013/0097662 A1 | 4/2013 | Pearcy et al. |
| 2013/0102283 A1 | 4/2013 | Lau et al. |
| 2013/0104236 A1 | 4/2013 | Ray et al. |
| 2013/0132551 A1 | 5/2013 | Bose et al. |
| 2013/0174259 A1 | 7/2013 | Pearcy et al. |
| 2013/0205366 A1 | 8/2013 | Luna et al. |
| 2013/0231084 A1 | 9/2013 | Raleigh |
| 2013/0238422 A1 | 9/2013 | Saldanha |
| 2013/0275574 A1 | 10/2013 | Hugard, IV et al. |
| 2013/0297729 A1 | 11/2013 | Suni et al. |
| 2013/0298192 A1 | 11/2013 | Kumar et al. |
| 2013/0305358 A1 | 11/2013 | Gathala et al. |
| 2013/0317808 A1 | 11/2013 | Kruel et al. |
| 2013/0320212 A1 | 12/2013 | Valentino et al. |
| 2013/0340035 A1 | 12/2013 | Uziel et al. |
| 2014/0075004 A1 | 3/2014 | Van Dusen et al. |
| 2014/0096215 A1 | 4/2014 | Hessler |
| 2014/0173727 A1 | 6/2014 | Lingafelt et al. |
| 2014/0199663 A1 | 7/2014 | Sadeh-Koniecpol et al. |
| 2014/0205099 A1 | 7/2014 | Christodorescu et al. |
| 2014/0214938 A1 | 7/2014 | Bhatt et al. |
| 2014/0283075 A1 | 9/2014 | Drissel et al. |
| 2014/0325634 A1 | 10/2014 | Iekel-Johnson et al. |
| 2014/0356445 A1 | 12/2014 | Little |
| 2015/0066896 A1 | 3/2015 | Davis et al. |
| 2015/0082430 A1 | 3/2015 | Sridhara et al. |
| 2015/0113646 A1 | 4/2015 | Lee et al. |
| 2015/0154263 A1 | 6/2015 | Boddhu et al. |
| 2015/0161386 A1 | 6/2015 | Gupta et al. |
| 2015/0199511 A1 | 7/2015 | Faile, Jr. et al. |
| 2015/0199629 A1 | 7/2015 | Faile, Jr. et al. |
| 2015/0205954 A1 | 7/2015 | Jou et al. |
| 2015/0215325 A1 | 7/2015 | Ogawa |
| 2015/0220625 A1 | 8/2015 | Cartmell et al. |
| 2015/0256550 A1 | 9/2015 | Taylor et al. |
| 2015/0269383 A1 | 9/2015 | Lang et al. |
| 2015/0288709 A1 | 10/2015 | Singhal et al. |
| 2015/0324559 A1 | 11/2015 | Boss et al. |
| 2015/0324563 A1 | 11/2015 | Deutschmann et al. |
| 2015/0350902 A1 | 12/2015 | Baxley et al. |
| 2016/0021117 A1 | 1/2016 | Harmon et al. |
| 2016/0036844 A1 | 2/2016 | Kopp et al. |

(56) References Cited

U.S. PATENT DOCUMENTS

| | | |
|---|---|---|
| 2016/0042179 A1 | 2/2016 | Weingarten et al. |
| 2016/0055334 A1 | 2/2016 | Herwono et al. |
| 2016/0078362 A1 | 3/2016 | Christodorescu et al. |
| 2016/0092774 A1 | 3/2016 | Wang et al. |
| 2016/0105334 A1 | 4/2016 | Boe et al. |
| 2016/0147380 A1 | 5/2016 | Coates et al. |
| 2016/0164922 A1 | 6/2016 | Boss et al. |
| 2016/0182556 A1* | 6/2016 | Tatourian ............... H04L 67/02 726/25 |
| 2016/0226914 A1 | 8/2016 | Doddy et al. |
| 2016/0232353 A1 | 8/2016 | Gupta et al. |
| 2016/0247158 A1 | 8/2016 | Kolotinsky |
| 2016/0261621 A1 | 9/2016 | Srivastava et al. |
| 2016/0277360 A1 | 9/2016 | Dwyier et al. |
| 2016/0277435 A1 | 9/2016 | Salajegheh et al. |
| 2016/0286244 A1 | 9/2016 | Chang et al. |
| 2016/0300049 A1 | 10/2016 | Guedalia et al. |
| 2016/0308890 A1 | 10/2016 | Weilbacher |
| 2016/0330219 A1 | 11/2016 | Hasan |
| 2016/0335865 A1 | 11/2016 | Sayavong et al. |
| 2016/0371489 A1 | 12/2016 | Puri et al. |
| 2017/0032274 A1 | 2/2017 | Yu et al. |
| 2017/0053280 A1 | 2/2017 | Lishok et al. |
| 2017/0063888 A1 | 3/2017 | Muddu et al. |
| 2017/0070521 A1 | 3/2017 | Bailey et al. |
| 2017/0104790 A1 | 4/2017 | Meyers et al. |
| 2017/0116054 A1 | 4/2017 | Boddhu et al. |
| 2017/0126718 A1 | 5/2017 | Baradaran et al. |
| 2017/0149795 A1 | 5/2017 | Day, II |
| 2017/0155669 A1 | 6/2017 | Sudo et al. |
| 2017/0214705 A1 | 7/2017 | Gupta |
| 2017/0230418 A1 | 8/2017 | Amar et al. |
| 2017/0244729 A1 | 8/2017 | Fahrny et al. |
| 2017/0255938 A1 | 9/2017 | Biegun et al. |
| 2017/0279616 A1 | 9/2017 | Loeb et al. |
| 2017/0286671 A1 | 10/2017 | Chari et al. |
| 2017/0331828 A1 | 11/2017 | Caldera et al. |
| 2017/0339176 A1* | 11/2017 | Backer ..................... H04L 67/22 |
| 2018/0004948 A1 | 1/2018 | Martin et al. |
| 2018/0007069 A1 | 1/2018 | Hunt et al. |
| 2018/0018456 A1 | 1/2018 | Chen et al. |
| 2018/0024901 A1 | 1/2018 | Tankersley et al. |
| 2018/0025273 A1 | 1/2018 | Jordan et al. |
| 2018/0027006 A1 | 1/2018 | Zimmermann et al. |
| 2018/0081661 A1 | 3/2018 | Gonzalez del Solar et al. |
| 2018/0082307 A1 | 3/2018 | Ochs et al. |
| 2018/0091520 A1 | 3/2018 | Camenisch et al. |
| 2018/0121514 A1 | 5/2018 | Reisz et al. |
| 2018/0145995 A1 | 5/2018 | Roeh et al. |
| 2018/0191745 A1 | 7/2018 | Moradi et al. |
| 2018/0191857 A1 | 7/2018 | Schooler et al. |
| 2018/0234434 A1 | 8/2018 | Viljoen |
| 2018/0248863 A1 | 8/2018 | Kao et al. |
| 2018/0285363 A1 | 10/2018 | Dennis et al. |
| 2018/0288063 A1 | 10/2018 | Koottayi et al. |
| 2018/0295141 A1 | 10/2018 | Solotorevsky |
| 2018/0332062 A1 | 11/2018 | Ford |
| 2018/0336353 A1 | 11/2018 | Manadhata et al. |
| 2018/0341758 A1 | 11/2018 | Park et al. |
| 2018/0341889 A1 | 11/2018 | Psalmonds et al. |
| 2018/0349684 A1 | 12/2018 | Bapat et al. |
| 2019/0014153 A1 | 1/2019 | Lang et al. |
| 2019/0034625 A1 | 1/2019 | Ford et al. |
| 2019/0052660 A1 | 2/2019 | Cassidy et al. |
| 2019/0174319 A1 | 6/2019 | Backholm et al. |
| 2019/0289021 A1 | 9/2019 | Ford |
| 2019/0294482 A1 | 9/2019 | Li et al. |
| 2019/0354703 A1 | 11/2019 | Ford |
| 2019/0356688 A1 | 11/2019 | Ford |
| 2019/0356699 A1 | 11/2019 | Ford |
| 2019/0387002 A1 | 12/2019 | Ford et al. |
| 2019/0387003 A1 | 12/2019 | Ford et al. |
| 2019/0392419 A1 | 12/2019 | DeLuca et al. |
| 2020/0034462 A1 | 1/2020 | Narayanaswamy et al. |
| 2020/0036740 A1 | 1/2020 | Ford |
| 2020/0089692 A1 | 3/2020 | Tripathi et al. |
| 2020/0334025 A1 | 10/2020 | Wang et al. |

OTHER PUBLICATIONS

Mesaros et al., Latent Semantic Analysis in Sound Event Detection, 19th European Signal Processing Conference (EUSIPCO 2011), pp. 1307-1311.

Marinescu, Dan C., Cloud Computing and Computer Clouds, University of Central Florida, 2012, pp. 1-246.

Symantec.com, Which tuning is available for improving the performance of Symantec Endpoint Protection clients during scan, https://support.symantec.com/en_US/article.TECH143941.html, Jan. 6, 2011.

Microsoft.com, Windows Search Overview, https://msdn.microsoft.com/en-us/library/windows/desktop/aa965362, printed Nov. 20, 2017.

Stephen G. Dimmock et al., Is Fraud Contagious? Co-Worker Influence on Misconduct by Financial Advisers, The Journal of Finance, first published online Feb. 3, 2018.

Thomas R. Hurd et al., A framework for analyzing contagion in assortative banking networks, PLoS ONE 12(2):e0170579, 2017.

Sans ISC InfoSec Forums, Tool to Detect Active Phishing Attacks Using Unicode Look-Alike Domains, downloaded Nov. 1, 2018, https://isc.sans.edu/forums/diary/Tool+to+Detect+Active+Phishing+Attacks+Using+Unicode+LookAlike+Domains/22310/.

L. F. Lafuerza et al., Exact Solution of a Stochastic Protein Dynamics Model with Delayed Degradation, Phys. Rev. E 84, 051121, Nov. 18, 2011, pp. 1-8.

Zoubin Ghahramani, Bayesian nonparametrics and the probabilistic approach to modelling, Philosophical Transactions A of the Royal Society, vol. 371 Issue: 1984, Published Dec. 31, 2012, pp. 1-20.

Elena Zheleva et al., Higher-order Graphical Models for Classification in Social and Affiliation Networks, NIPS 2010 Workshop on Networks Across Disciplines: Theory and Applications, Whistler BC, Canada, 2010, pp. 1-7.

Varun Chandola et al., Anomaly Detection: A Survey, ACM Computing Surveys, vol. 41, No. 3, Article 15, Jul. 2009, pp. 15.1-58.1.

Judea Pearl, The Causal Foundations of Structural Equation Modeling, Technical Report R-370, Computer Science Department, University of California, Los Angeles, also Chapter 5, R. H. Hoyle (Ed.), Handbook of Structural Equation Modeling, New York, Guilford Press, Jun. 4, 2012, pp. 68-91.

Yueh-Hsuan Chiang, Towards Large-Scale Temporal Entity Matching, Dissertation Abstract, University of Wisconsin-Madison, 2013.

Furong Li, Linking Temporal Records for Profiling Entities, 2015, SIGMOD '15 Proceedings of the 2015 ACM SIGMOD International Conference on Management of Data, pp. 593-605, https://users.soe.ucsc.edu/~tan/papers/2015/modf445-li.pdf.

Peter Christen et al., Adaptive Temporal Entity Resolution on Dynamic Databases, Apr. 2013, http://users.cecs.anu.edu.au/~Peter.Christen/publications/christen2013pakdd-slides.pdf.

Wikipedia, Categorical Distribution, edited Jul. 28, 2018, https://en.wikipedia.org/wiki/Categorical_distribution.

Wikipedia, One-Hot, edited May 22, 2018, https://en.wikipedia.org/wiki/One-hot.

Sean Barnum, Standardized Cyber Threat Intelligence Information with the Structured Threat Information eXpression (STIX) Whitepaper v1.1 (Feb. 20, 2014).

Xiang Sun et al., Event Detection in Social Media Data Streams, IEEE International Conference on Computer and Information Technology; Ubiquitous Computing and Communications; Dependable, Automatic and Secure Computing; Persuasive Intelligence and Computing, pp. 1711-1717, Dec. 2015.

John Backes et al., Semantic-based Automated Reasoning for AWS Access Policies using SMT, 2018 Formal Methods in Computer Aided Design (FMCAD), Oct. 30-Nov. 2, 2018 https://d1.awsstatic.com/Security/pdfs/Semantic_Based_Automated_Reasoning_for_AWS_Access_Policies_Using_SMT.pdf.

Crandall et al., Inferring Social Ties from Geographic Coincidences, PNAS, vol. 107, No. 52, 2010, pp. 22436-22441, 2010.

(56) References Cited

OTHER PUBLICATIONS

Ross et al., Bully Prevention in Positive Behavior Support, Journal of Applied Behavior Analysis, 42(4), pp. 747-759, 2009.

Matt Klein, How to Erase Your iOS Device After Too Many Failed Passcode Attempts, https://www.howtogeek.com/264369/ how-to-erase-your-ios-device-after-too-many-failed-passcode-attempts/, Jul. 28, 2016.

Github, The Z3 Theorem Prover, retrieved from internet May 19, 2020, https://github.com/Z3Prover/z3.

Singh et al., Container-Based Microservice Architecture for Cloud Applications, International Conference on Computing, Communication and Automation (ICCCA2017), 2017.

Barrere et al., Vulnerability Assessment in Autonomic Networks and Services: A Survey, IEEE, Aug. 30, 2013, vol. 16, issue. 2, pp. 988-1004.

Burns et al., Automatic Management of Network Security Policy, IEEE, Jun. 14, 2001, pp. 12-26.

S. Chambi et al., Better bitmap performance with Roaring bitmaps, arXiv:1402.6407v10 [cs.DB] (Mar. 15, 2016).

Jianguo Wang et al., An Experimental Study of Bitmap Compression vs. Inverted List Compression, SIGMOD 2017: Proceedings of the 2017 ACM Int'l Conf. on Management of Data, pp. 993-1008 (May 2017).

Sanjeev Goyal et al., Attack, Defence and Contagion in Networks, The Review of Economic Studies, vol. 81, Issue 4, Oct. 2014, pp. 1518-1542, https://doi.org/10.1093/restud/rdu013 (2014).

* cited by examiner

CONTAGION RISK DETECTION, ANALYSIS AND PROTECTION

BACKGROUND OF THE INVENTION

Field of the Invention

The present invention relates in general to the field of computers and similar technologies, and in particular to software utilized in this field. In one aspect, the present invention relates to an apparatus, system, method, and computer program product for dynamic data protection against risk events.

Description of the Related Art

Users interact with physical, system, data, and services resources of all kinds, as well as each other, on a daily basis. Each of these interactions, whether accidental or intended, poses some degree of security risk. However, not all user behavior poses the same risk. For example, a user accessing an organization's proprietary resources typically poses a higher risk than the same user perusing an online website during working hours. In addition, one user's behavior can have greater effects on the behavior of other users in the organization, depending on the level of influence and connection relationships with that user's co-workers and others. Furthermore, determining the extent of risk corresponding to individual events can be difficult. Consequently, indiscriminately applying the same policy to all user behavior instead of adjusting security oversight and response accordingly may result in inefficient utilization of security system resources. As seen from the foregoing, existing solutions for identifying and controlling anomalous, abnormal, unexpected, or malicious user behavior are extremely difficult at a practical level by virtue of the challenges with correctly assessing the effects of malicious user behavior, especially as such behavior and related influences on others may not be readily apparent when employing typical security monitoring approaches.

SUMMARY OF THE INVENTION

A method, system and computer-usable medium are disclosed for automatically detecting, analyzing, and protecting against contagion-based risk events in real-time.

BRIEF DESCRIPTION OF THE DRAWINGS

The present invention may be better understood, and its numerous objects, features and advantages made apparent to those skilled in the art by referencing the accompanying drawings.

DETAILED DESCRIPTION

Figure 1:
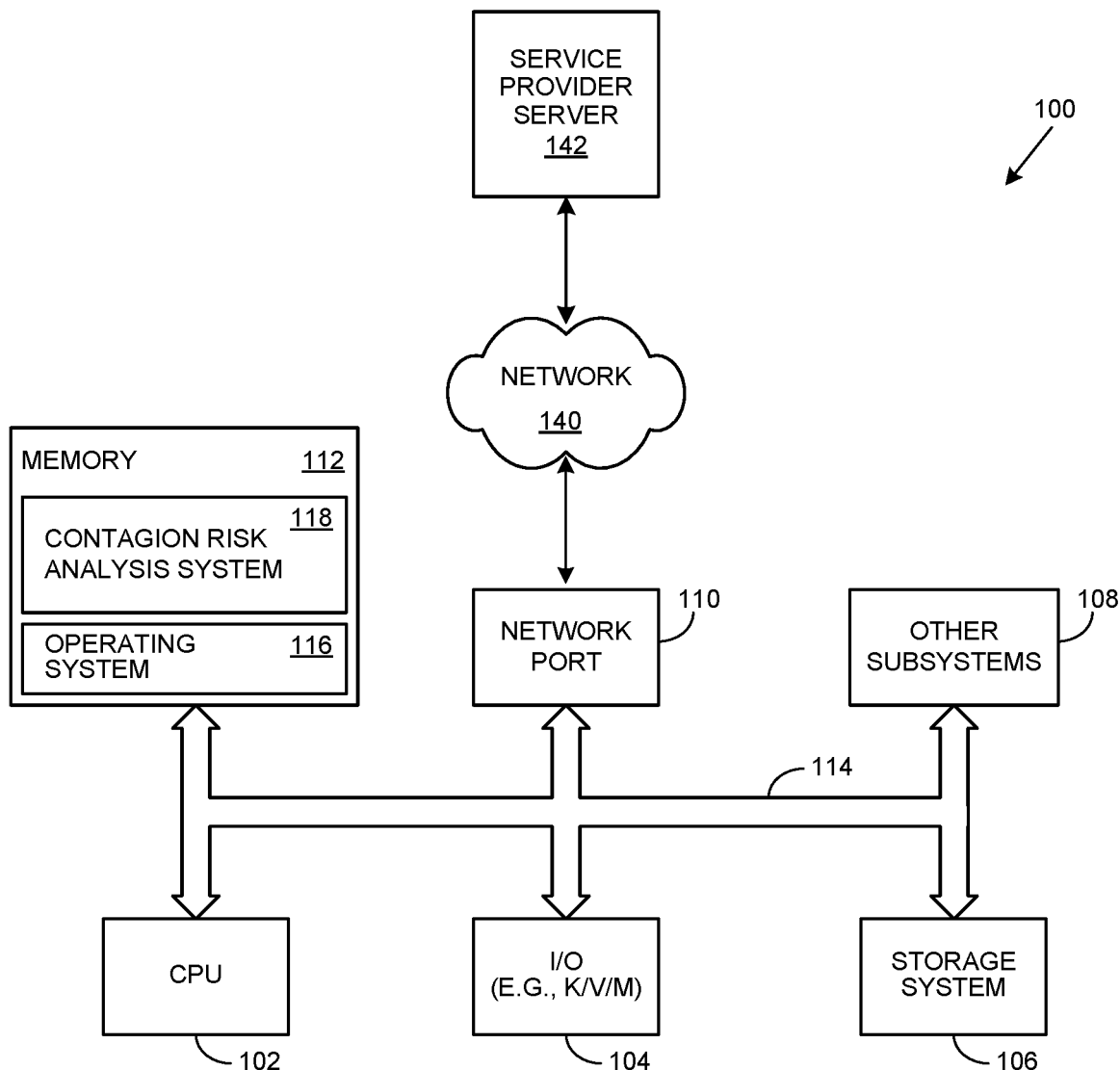
FIG. 1 depicts an exemplary client computer in accordance with selected embodiments of the present disclosure.

A method, system and computer program product are disclosed for detecting, analyzing, and protecting against contagion-based risk events in real-time. Certain aspects of the invention reflect an appreciation that social behavior between individuals can result in individuals having influential or "contagious" effects on the actions of co-workers or other networked connections. Certain aspects of the invention likewise reflect an appreciation that the analysis of such behavior and/or connections can include the processing of an individual's electronic data and communications to detect and discover contagion networks between individuals based on behavior analytics, detection of trigger events, side channel monitoring, and proximity analytics. Likewise, certain aspects of the invention reflect an appreciation that such contagion networks can be used to perform risk analysis for individuals in real-time in a streaming environment through the assignment of risk scores to each individual and that individual's networked connections on the basis of risk contagion assessments which enables the system to predict the contagion effects of bad behavior by the individual. Finally, certain aspects of the invention provide mechanisms for automatically protecting and controlling against the effects of contagious behavior with specified auto-prevention and policy enforcement tools and/or risk adaptive protection tools, such as dynamic data protection, access limitations, or the like.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a mobile device such as a tablet or smartphone, a consumer electronic device, a connected "smart device," a network appliance, a network storage device, a network gateway device, a server or collection of servers or any other suitable device and may vary in size, shape, performance, functionality, and price. The information handling system may include volatile and/or non-volatile memory, and one or more processing resources such as a central processing unit (CPU) or hardware or software control logic. Additional components of the information handling system may include one or more storage systems, one or more wired or wireless interfaces for communicating with other networked devices, external devices, and various input and output (I/O) devices, such as a keyboard, a mouse, a microphone, speakers, a track pad, a touchscreen and a display device (including a touch sensitive display device). The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, non-transitory storage media such as a direct access storage device (e.g., a hard disk drive or solid state drive), a sequential access storage device (e.g., a tape disk drive), optical storage device, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

FIG. 1 is a generalized illustration of an information handling system 100 that can be used to implement selected embodiments of the present disclosure. The information handling system 100 includes a processor (e.g., central processor unit or "CPU") 102, input/output (I/O) devices 104, such as a display, a keyboard, a mouse, and associated controllers, a storage system 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further includes operating system (OS) 116 and in various embodiments may also include a contagion risk analysis system 118. In one embodiment, the information handling system 100 is able to download the contagion risk analysis system 118 from the service provider server 142. In another embodiment, the contagion risk analysis system 118 is provided as a service from the service provider server 142.

In various embodiments, the contagion risk analysis system 118 performs a contagion-based risk analysis operation. In certain embodiments, the contagion-based risk analysis operation improves processor efficiency, and thus the efficiency of the information handling system 100, by automatically detecting, analyzing, and protecting against contagion-based risk events. As will be appreciated, once the information handling system 100 is configured to perform the contagion-based risk analysis operation, the information handling system 100 becomes a specialized computing device specifically configured to perform the contagion-based risk analysis operation and is not a general purpose computing device. Moreover, the implementation of the contagion risk analysis system 118 on the information handling system 100 improves the functionality of the information handling system 100 and provides a useful and concrete result of detecting, analyzing, and protecting against contagion-based risk events.

Figure 2:
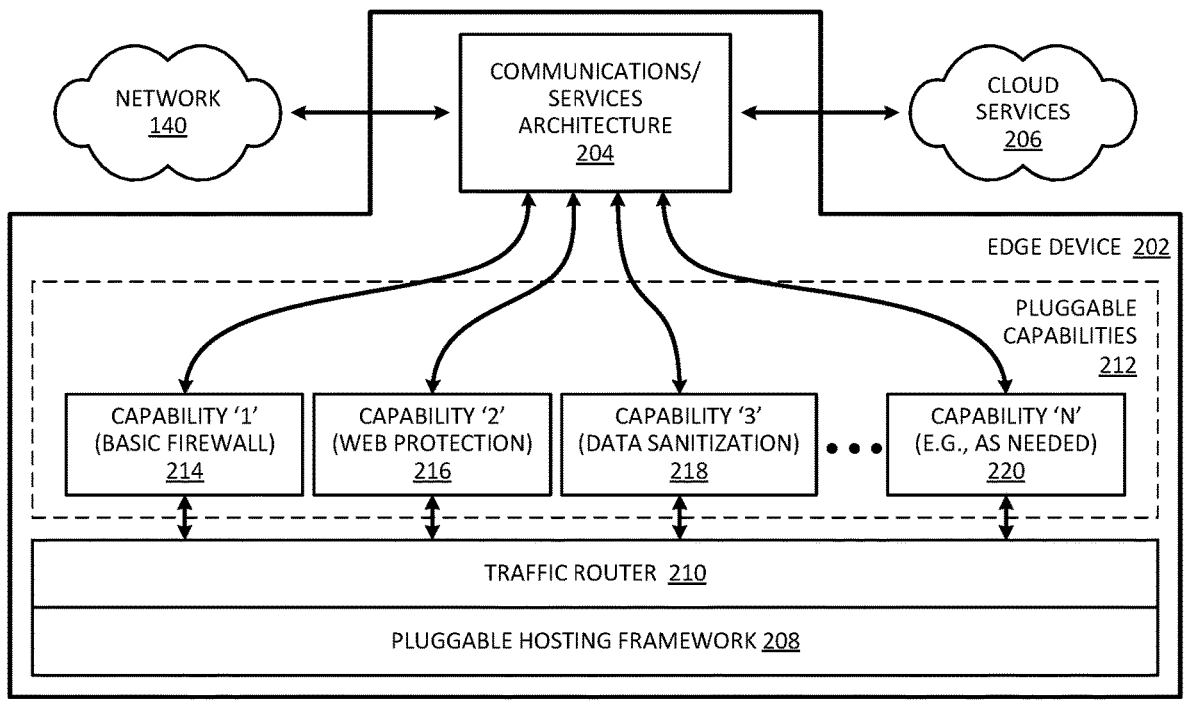
FIG. 2 is a simplified block diagram of an edge device in accordance with selected embodiments of the present disclosure.

FIG. 2 is a simplified block diagram of an edge device implemented in accordance with selected embodiments of the present disclosure. As used herein, an edge device, such as the edge device 202 shown in FIG. 2, broadly refers to a device providing an entry point into a network 140. Examples of such edge devices 202 may include routers, routing switches, integrated access devices (IADs), multiplexers, wide-area network (WAN) access devices, and network security appliances. In certain embodiments, the network 140 may be a private network (e.g., an enterprise network), a semi-public network (e.g., a service provider core network), or a public network (e.g., the Internet).

Skilled practitioners of the art will be aware that edge devices 202 are often implemented as routers that provide authenticated access to faster, more efficient backbone and core networks. Furthermore, current industry trends include making edge devices 202 more intelligent, which allows core devices to operate at higher speed as they are not burdened with additional administrative overhead. Accordingly, such edge devices 202 often include Quality of Service (QoS) and multi-service functions to manage different types of traffic. Consequently, it is common to design core networks with switches that use routing protocols such as Open Shortest Path First (OSPF) or Multiprotocol Label Switching (MPLS) for reliability and scalability. Such approaches allow edge devices 202 to have redundant links to the core network, which not only provides improved reliability, but enables enhanced, flexible, and scalable security capabilities as well.

In certain embodiments, the edge device 202 may be implemented to include a communications/services architecture 204, various pluggable capabilities 212, a traffic router 210, and a pluggable hosting framework 208. In certain embodiments, the communications/services architecture 202 may be implemented to provide access to and from various networks 140, cloud services 206, or a combination thereof. In certain embodiments, the cloud services 206 may be provided by a cloud infrastructure familiar to those of skill in the art. In certain embodiments, the edge device 202 may be implemented to provide support for a variety of generic services, such as directory integration, logging interfaces, update services, and bidirectional risk/context flows associated with various analytics. In certain embodiments, the edge device 202 may be implemented to provide temporal information, described in greater detail herein, associated with the provision of such services.

In certain embodiments, the edge device 202 may be implemented as a generic device configured to host various network communications, data processing, and security management capabilities. In certain embodiments, the pluggable hosting framework 208 may be implemented to host such capabilities in the form of pluggable capabilities 212. In certain embodiments, the pluggable capabilities 212 may include capability '1' 214 (e.g., basic firewall), capability '2' 216 (e.g., general web protection), capability '3' 218 (e.g., data sanitization), and so forth through capability 'n' 220, which may include capabilities needed for a particular operation, process, or requirement on an as-needed basis. In certain embodiments, such capabilities may include the performance of operations associated with detecting, analyzing, and protecting against contagion-based risk events, as described in greater detail herein. In certain embodiments, such operations may include the provision of associated temporal information (e.g., time stamps).

In certain embodiments, the pluggable capabilities 212 may be sourced from various cloud services 206. In certain embodiments, the pluggable hosting framework 208 may be implemented to provide certain computing and communication infrastructure components, and foundation capabilities, required by one or more of the pluggable capabilities 212. In certain embodiments, the pluggable hosting framework 208 may be implemented to allow the pluggable capabilities 212 to be dynamically invoked. Skilled practitioners of the art will recognize that many such embodiments are possible. Accordingly, the foregoing is not intended to limit the spirit, scope or intent of the invention.

Figure 3:
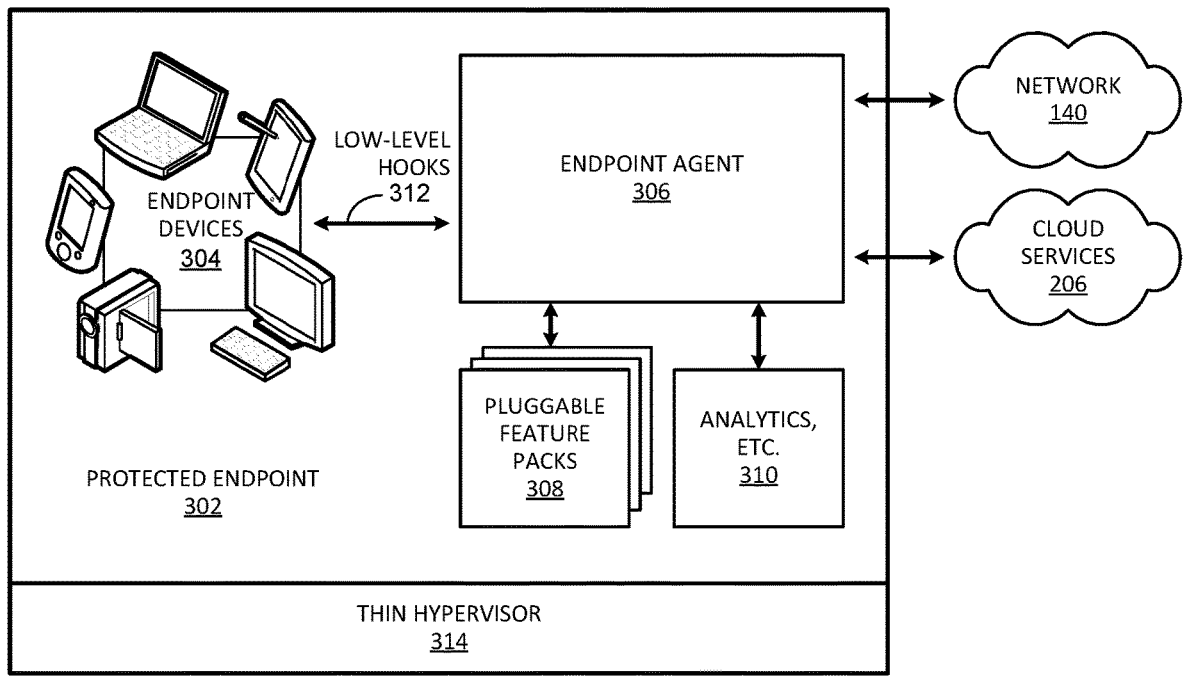
FIG. 3 is a simplified block diagram of an endpoint agent in accordance with selected embodiments of the present disclosure.

FIG. 3 is a simplified block diagram of an endpoint agent implemented in accordance with selected embodiments of the present disclosure. As used herein, an endpoint agent 306 broadly refers to a software agent used in combination with an endpoint device 304 to establish a protected endpoint 302. Skilled practitioners of the art will be familiar with software agents, which are computer programs that perform actions on behalf of a user or another program. In various approaches, a software agent may be autonomous or work together with another agent or a user. In certain of these approaches the software agent is implemented to autonomously decide if a particular action is appropriate for a given event, such as an observed user behavior.

An endpoint device 304, as likewise used herein, refers to an information processing system such as a personal computer, a laptop computer, a tablet computer, a personal digital assistant (PDA), a smart phone, a mobile telephone, a digital camera, a video camera, or other device that is capable of storing, processing and communicating data. In certain embodiments, the communication of the data may take place in real-time or near-real-time. As used herein, real-time broadly refers to processing and providing information within a time interval brief enough to not be discernable by a user. As an example, a cellular phone conversation may be used to communicate information in real-time, while an instant message (IM) exchange may be used to communicate information in near real-time. In certain embodiments, the communication of the information may take place asynchronously. For example, an email message may be stored on an endpoint device 304 when it is offline. In this example, the information may be communicated to its intended recipient once the endpoint device 304 gains access to a network 140.

A protected endpoint 302, as likewise used herein, broadly refers to a policy-based approach to network security that typically requires endpoint devices 304 to comply with particular criteria before they are granted access to network resources. As an example, a given endpoint device 304 may be required to have a particular operating system (OS), or version thereof, a Virtual Private Network (VPN) client, anti-virus software with current updates, and so forth. In various embodiments, the protected endpoint 302 may be implemented to perform operations associated with detecting, analyzing, and protecting against contagion-based risk events, as described in greater detail herein. In various embodiments, the protected endpoint may be implemented to collect and provide certain information associated with each user's network of connections and with each event, described in greater detail herein. In certain embodiments, the protected endpoint 302 may be implemented to provide temporal information, such as timestamp information, associated with such operations.

In certain embodiments, the endpoint agent 306 may be implemented to universally support a variety of operating systems, such as Apple Macintosh®, Microsoft Windows®, Linux®, Android® and so forth. In certain embodiments, the endpoint agent 306 may be implemented to interact with the endpoint device 304 through the use of low-level hooks 312 at the OS level. It will be appreciated that the use of low-level hooks 312 allows the endpoint agent 306 to subscribe to multiple events through a single hook. Consequently, multiple functionalities provided by the endpoint agent 306 can share a single data stream, using only those portions of the data stream they may individually need. Accordingly, system efficiency can be improved and operational overhead reduced.

In certain embodiments, the endpoint agent 306 may be implemented to provide a common infrastructure for pluggable feature packs 308. In various embodiments, the pluggable feature packs 308 may provide certain security management functionalities. Examples of such functionalities may include various anti-virus and malware detection, data loss protection (DLP), insider threat detection, and so forth. In certain embodiments, the security management functionalities may include one or more functionalities associated with analyzing contagion-based risk events in real time, as described in greater detail herein.

In certain embodiments, a particular pluggable feature pack 308 may be invoked as needed by the endpoint agent 306 to provide a given functionality. In certain embodiments, individual features of a particular pluggable feature pack 308 are invoked as needed. It will be appreciated that the ability to invoke individual features of a pluggable feature pack 308, without necessarily invoking all such features, will likely improve the operational efficiency of the endpoint agent 306 while simultaneously reducing operational overhead. Accordingly, the endpoint agent 306 can self-optimize in certain embodiments by using the common infrastructure and invoking only those pluggable components that are applicable or needed for a given user behavior.

In certain embodiments, the individual features of a pluggable feature pack 308 may be invoked by the endpoint agent 306 according to the occurrence of a particular user behavior. In certain embodiments, the individual features of a pluggable feature pack 308 may be invoked by the endpoint agent 306 according to the occurrence of a particular event, described in greater detail herein. In certain embodiments, the individual features of a pluggable feature pack 308 may be invoked by the endpoint agent 306 at a particular point in time. In these embodiments, the method by which a given user behavior, event, or point in time is selected is a matter of design choice.

In certain embodiments, the individual features of a pluggable feature pack 308 may be invoked by the endpoint agent 306 according to the context of a particular user behavior. As an example, the context may be the user enacting the user behavior, their associated risk classification, which resource they may be requesting, the point in time the user behavior is enacted, and so forth. In certain embodiments, the pluggable feature packs 308 may be sourced from various cloud services 206. In certain embodiments, the pluggable feature packs 308 may be dynamically sourced from various cloud services 206 by the endpoint agent 306 on an as-need basis.

In certain embodiments, the endpoint agent 306 may be implemented with additional functionalities, such as event analytics 310. In certain embodiments, the event analytics 310 functionality may include analysis of various user behaviors and networked connections, described in greater detail herein. In certain embodiments, the event analytics 310 functionality may include analyzing the communications and data of a particular user to derive a contagion network which is used to perform risk analysis for individuals in real-time by assigning risk scores to each individual and that individual's networked connections on the basis of risk contagion assessments which enables the system to predict and prevent the contagion effects of bad behavior by the individual, as described in greater detail herein. In certain embodiments, a particular event may in turn be associated with one or more user behaviors, likewise described in greater detail herein.

In certain embodiments, the endpoint agent 306 may be implemented with a thin hypervisor 314, which can be run at Ring −1, thereby providing protection for the endpoint agent 306 in the event of a breach. As used herein, a thin hypervisor broadly refers to a simplified, OS-dependent hypervisor implemented to increase security. As likewise used herein, Ring −1 broadly refers to approaches allowing guest operating systems to run Ring 0 (i.e., kernel) operations without affecting other guests or the host OS. Those of skill in the art will recognize that many such embodiments and examples are possible. Accordingly, the foregoing is not intended to limit the spirit, scope or intent of the invention.

Figure 4:
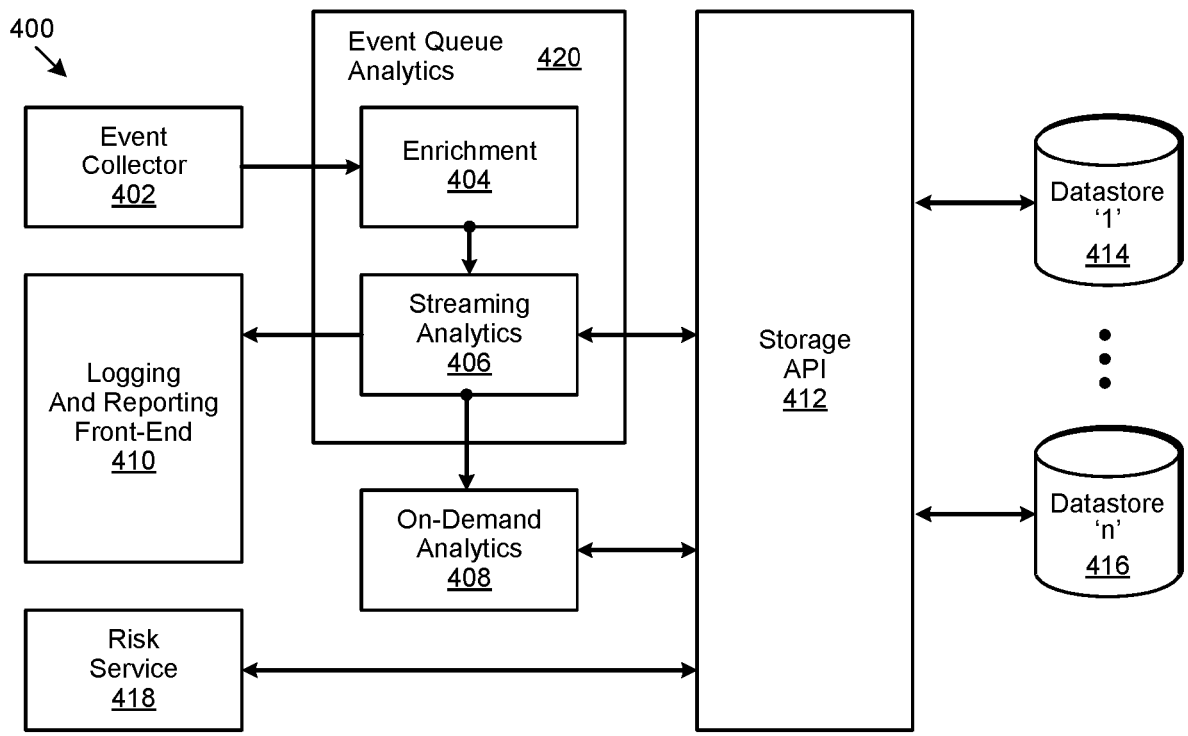
FIG. 4 is a simplified block diagram of a security analytics system in accordance with selected embodiments of the present disclosure.

FIG. 4 is a simplified block diagram of a security analytics system in accordance with selected embodiments of the present disclosure. In certain embodiments, the security analytics system shown in FIG. 4 may be implemented to provide log storage, reporting, and analytics capable of performing streaming 406 and on-demand 408 analytics operations. In certain embodiments, such operations may be associated with defining and managing a user profile and associated contagion network, as described in greater detail herein. In certain embodiments, the security analytics system may be implemented to provide a uniform platform for storing events and contextual information associated with various user behaviors and performing longitudinal analytics.

As used herein, longitudinal analytics broadly refers to performing analytics of user behaviors occurring over a particular period of time. As an example, a user may iteratively attempt to access certain proprietary information stored in various locations. In addition, the attempts may occur over a brief period of time. To continue the example, the fact that the information the user is attempting to access is proprietary, that it is stored in various locations, and the attempts are occurring in a brief period of time, in combination, may indicate the user behavior enacted by the user is suspicious. As another example, certain entity identifier information (e.g., a user name) associated with a user may change over time. In this example, the change in user name, during a particular period of time or at a particular point in time, may represent suspicious user behavior.

In certain embodiments, the security analytics system may be implemented to be scalable. In certain embodiments, the security analytics system may be implemented in a centralized location, such as a corporate data center. In these embodiments, additional resources may be added to the security analytics system as needs grow. In certain embodiments, the security analytics system may be implemented as a distributed system. In these embodiments, the security analytics system may span multiple information processing systems. In certain embodiments, the security analytics system may be implemented in a cloud environment. In certain embodiments, the security analytics system may be implemented in a virtual machine (VM) environment. In such an embodiment, the VM environment may be configured to dynamically and seamlessly scale the security analytics system as needed. Skilled practitioners of the art will recognize that many such embodiments are possible. Accordingly, the foregoing is not intended to limit the spirit, scope or intent of the invention.

In certain embodiments, an event collector 402 may be implemented to collect event and contextual information, described in greater detail herein, associated with various user behaviors. In these embodiments, the method by which the event and contextual information collected by the event collector 402 is selected to be collected is a matter of design choice. In certain embodiments, the event and contextual information collected by the event collector 402 may be processed by an enrichment module 404 to generate enriched user behavior information. In certain embodiments, the enrichment may include certain contextual information related to a particular user behavior. In certain embodiments, the enrichment may include certain temporal information, such as timestamp information, related to a particular user behavior.

In certain embodiments, enriched user behavior information may be provided by the enrichment module 404 to a streaming 406 analytics module. In turn, the streaming 406 analytics module may provide some or all of the enriched user behavior information to an on-demand 408 analytics module. As used herein, streaming 406 analytics broadly refers to analytics performed in near real-time on enriched user behavior information as it is received. Likewise, on-demand 408 analytics broadly refers herein to analytics performed, as it is requested, on enriched user behavior information after it has been received. In certain embodiments, the enriched user behavior information may be associated with a particular event. In certain embodiments, the enrichment 404 and streaming analytics 406 modules may be implemented to perform event queue analytics 420 operations, as described in greater detail herein.

In certain embodiments, the on-demand 408 analytics may be performed on enriched user behavior associated with a particular interval of, or point in, time. In certain embodiments, the streaming 406 or on-demand 408 analytics may be performed on enriched user behavior associated with a particular user, group of users, one or more entities, or a combination thereof. In certain embodiments, the streaming 406 or on-demand 408 analytics may be performed on enriched user behavior associated with a particular resource, such as a facility, system, datastore, or service. Those of skill in the art will recognize that many such embodiments are possible. Accordingly, the foregoing is not intended to limit the spirit, scope or intent of the invention.

In certain embodiments, the results of various analytics operations performed by the streaming 406 or on-demand 408 analytics modules may be provided to a storage Application Program Interface (API) 412. In turn, the storage API 412 may be implemented to provide access to various datastores '1' 414 through 'n' 416, which in turn are used to store the results of the analytics operations. In certain embodiments, the security analytics system may be implemented with a logging and reporting front-end 410, which is used to receive the results of analytics operations performed by the streaming 406 analytics module. In certain embodiments, the datastores '1' 414 through 'n' 416 may variously include a datastore of entity identifiers, temporal events, or a combination thereof.

In certain embodiments, the security analytics system may be implemented to provide a risk management service 418. In certain embodiments, the risk management service 418 may be implemented to perform operations associated with defining and managing a user profile, as described in greater detail herein. In certain embodiments, the risk management service 418 may be implemented to provide the results of various analytics operations performed by the streaming 406 or on-demand 408 analytics modules. In certain embodiments, the risk management service 418 may be implemented to use the storage API 412 to access various enhanced cyber behavior and analytics information stored on the datastores '1' 414 through 'n' 416. Skilled practitioners of the art will recognize that many such embodiments are possible. Accordingly, the foregoing is not intended to limit the spirit, scope or intent of the invention.

Figure 5:
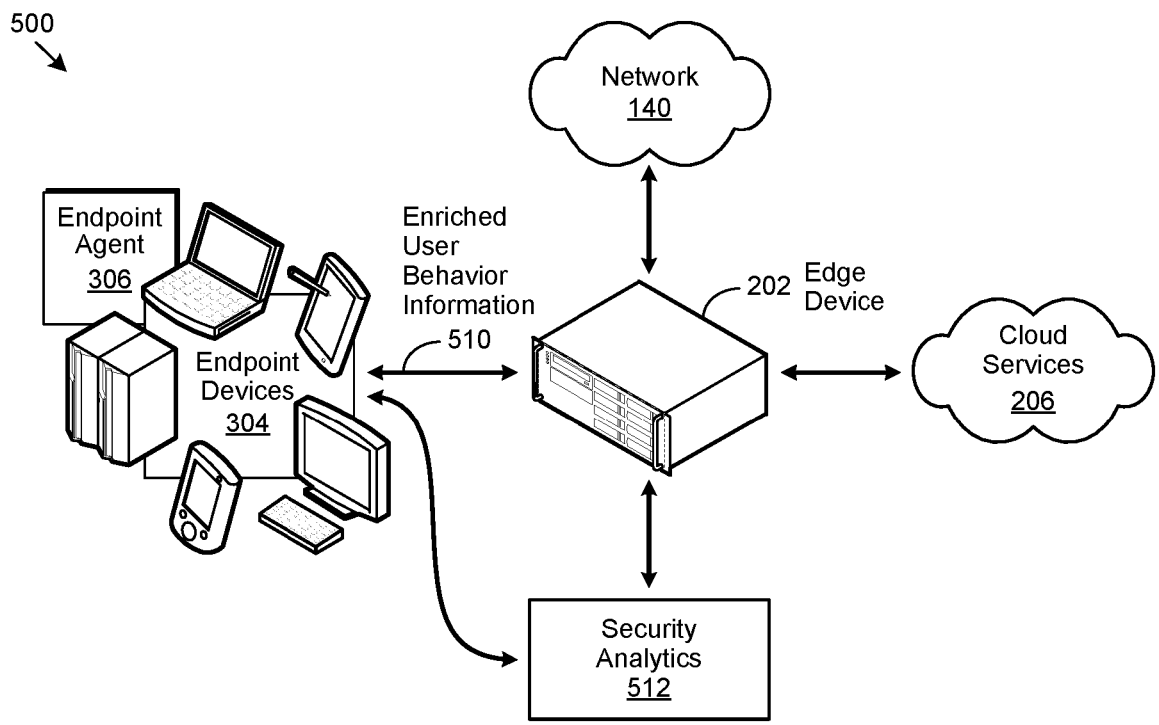
FIG. 5 is a simplified block diagram of the operation of a security analytics system in accordance with selected embodiments of the present disclosure.

FIG. 5 is a simplified block diagram of the operation of a security analytics system in accordance with selected embodiments of the present disclosure. In certain embodiments, the security analytics system 512 may be implemented to perform operations associated with analyzing contagion-based risk events, as described in greater detail herein. In certain embodiments, the security analytics system 512 may be implemented in combination with one or more endpoint agents 306, one or more edge devices 202, cloud services 206, a security analytics system 512, and a network 140 to perform such operations.

In certain embodiments, the network edge device 202 may be implemented in a bridge, a firewall, or a passive monitoring configuration. In certain embodiments, the edge device 202 may be implemented as software running on an information processing system. In certain embodiments, the network edge device 202 may be implemented to provide integrated logging, updating and control. In certain embodiments, the edge device 202 may be implemented to receive network requests and context-sensitive cyber behavior information in the form of enriched cyber behavior information 510, described in greater detail herein, from an endpoint agent 306, likewise described in greater detail herein.

In certain embodiments, the security analytics system 512 may be implemented as both a source and a sink of user behavior information. In certain embodiments, the security analytics system 512 may be implemented to serve requests for user/resource risk data. In certain embodiments, the edge device 202 and the endpoint agent 306, individually or in combination, may provide certain user behavior information to the security analytics system 512 using either push or pull approaches familiar to skilled practitioners of the art.

As described in greater detail herein, the edge device 202 may be implemented in certain embodiments to receive enriched user behavior information 510 from the endpoint agent 306. It will be appreciated that such enriched user behavior information 510 will likely not be available for provision to the edge device 202 when an endpoint device 304 is not implemented for a corresponding endpoint agent 306. However, the lack of such enriched user behavior information 510 may be accommodated in various embodiments, albeit with reduced functionality related to operations associated with defining and managing a user profile.

In certain embodiments, a given user behavior may be enriched by an associated endpoint agent 306 attaching contextual information to a request. In certain embodiments, the context is embedded within a network request, which is then provided as enriched user behavior information 510. In certain embodiments, the contextual information may be concatenated, or appended, to a request, which in turn may be provided as enriched user behavior information 510. In these embodiments, the enriched user behavior information 510 may be unpacked upon receipt and parsed to separate the request and its associated contextual information. Those of skill in the art will recognize that one possible disadvantage of such an approach is that it may perturb certain Intrusion Detection System and/or Intrusion Detection Prevention (IDS/IDP) systems implemented on a network 140.

In certain embodiments, new flow requests may be accompanied by a contextual information packet sent to the edge device 202. In these embodiments, the new flow requests may be provided as enriched user behavior information 510. In certain embodiments, the endpoint agent 306 may also send updated contextual information to the edge device 202 once it becomes available. As an example, an endpoint agent 306 may share a list of files that have been read by a current process at any point in time once the information has been collected. To continue the example, such a list of files may be used to determine which data the endpoint agent 306 may be attempting to exfiltrate.

In certain embodiments, point analytics processes executing on the edge device 202 may request a particular service. As an example, risk scores on a per-user basis may be requested. In certain embodiments, the service may be requested from the security analytics system 512. In certain embodiments, the service may be requested from various cloud services 206.

In certain embodiments, contextual information associated with a user behavior may be attached to various network service requests. In certain embodiments, the request may be wrapped and then handled by proxy. In certain embodiments, a small packet of contextual information associated with a user behavior may be sent with a service request. In certain embodiments, service requests may be related to Domain Name Service (DNS), web browsing activity, email, and so forth, all of which are essentially requests for service by an endpoint device 304. In certain embodiments, such service requests may be associated with temporal event information, described in greater detail herein. Consequently, such requests can be enriched by the addition of user behavior contextual information (e.g., UserAccount, interactive/automated, data-touched, temporal event information, etc.). Accordingly, the edge device 202 can then use this information to manage the appropriate response to submitted requests.

In certain embodiments, the security analytics system 512 may be implemented in different operational configurations. In certain embodiments, the security analytics system 512 may be implemented by using the endpoint agent 306. In certain embodiments, the security analytics system 512 may be implemented by using endpoint agent 306 in combination with the edge device 202. In certain embodiments, the cloud services 206 may likewise be implemented for use by the endpoint agent 306, the edge device 202, and the security analytics system 512, individually or in combination. In these embodiments, the security analytics system 512 may be primarily oriented to performing risk assessment operations related to user actions, program actions, data accesses, or a combination thereof. In certain embodiments, program actions may be treated as a proxy for the user.

In certain embodiments, the endpoint agent 306 may be implemented to update the security analytics system 512 with user behavior and associated contextual information, thereby allowing an offload of certain analytics processing overhead. In certain embodiments, this approach allows for longitudinal risk scoring, which assesses risk associated with certain user behavior during a particular interval of time. In certain embodiments, the security analytics system 512 may be implemented to access risk scores associated with the same user account, but accrued on different endpoint devices 304. It will be appreciated that such an approach may prove advantageous when an adversary is "moving sideways" through a network environment, using different endpoint devices 304 to collect information.

In certain embodiments, the security analytics system 512 may be primarily oriented to applying risk mitigations in a way that maximizes security effort return-on-investment (ROI). In certain embodiments, this approach may be accomplished by providing additional contextual and user behavior information associated with user requests. As an example, a web gateway may not concern itself with why a particular file is being requested by a certain entity at a particular point in time. Accordingly, if the file cannot be identified as malicious or harmless, there is no context available to determine how, or if, to proceed. To extend the example, the edge device 202 and security analytics system 512 may be coupled such that requests can be contextualized and fitted into a framework that evaluates their associated risk. It will be appreciated that such an embodiment works well with web-based data loss protection (DLP) approaches, as each transfer is no longer examined in isolation, but in the broader context of an identified user's actions, at a particular time, on the network 140.

As another example, the security analytics system 512 may be implemented to perform risk scoring processes to decide whether to block or allow unusual flows. It will be appreciated that such an approach is highly applicable to defending against point-of-sale (POS) malware, a breach technique that has become increasingly more common in recent years. It will likewise be appreciated that while various edge device 202 implementations may not stop all such exfiltrations, they may be able to complicate the task for the attacker.

In certain embodiments, the security analytics system 512 may be primarily oriented to maximally leverage contextual information associated with various user behaviors within the system. In certain embodiments, data flow tracking is performed by one or more endpoint agents 306, which allows the quantity and type of information associated with particular hosts to be measured. In turn, this information may be used to determine how the edge device 202 handles requests. By contextualizing such user behavior on the network 140, the security analytics system 512 can provide intelligent protection, making decisions that make sense in the broader context of an organization's activities. It will be appreciated that one advantage to such an approach is that information flowing through an organization, and the networks they employ, should be trackable, and substantial data breaches preventable. Skilled practitioners of the art will recognize that many such embodiments and examples are possible. Accordingly, the foregoing is not intended to limit the spirit, scope or intent of the invention.

Figure 6:
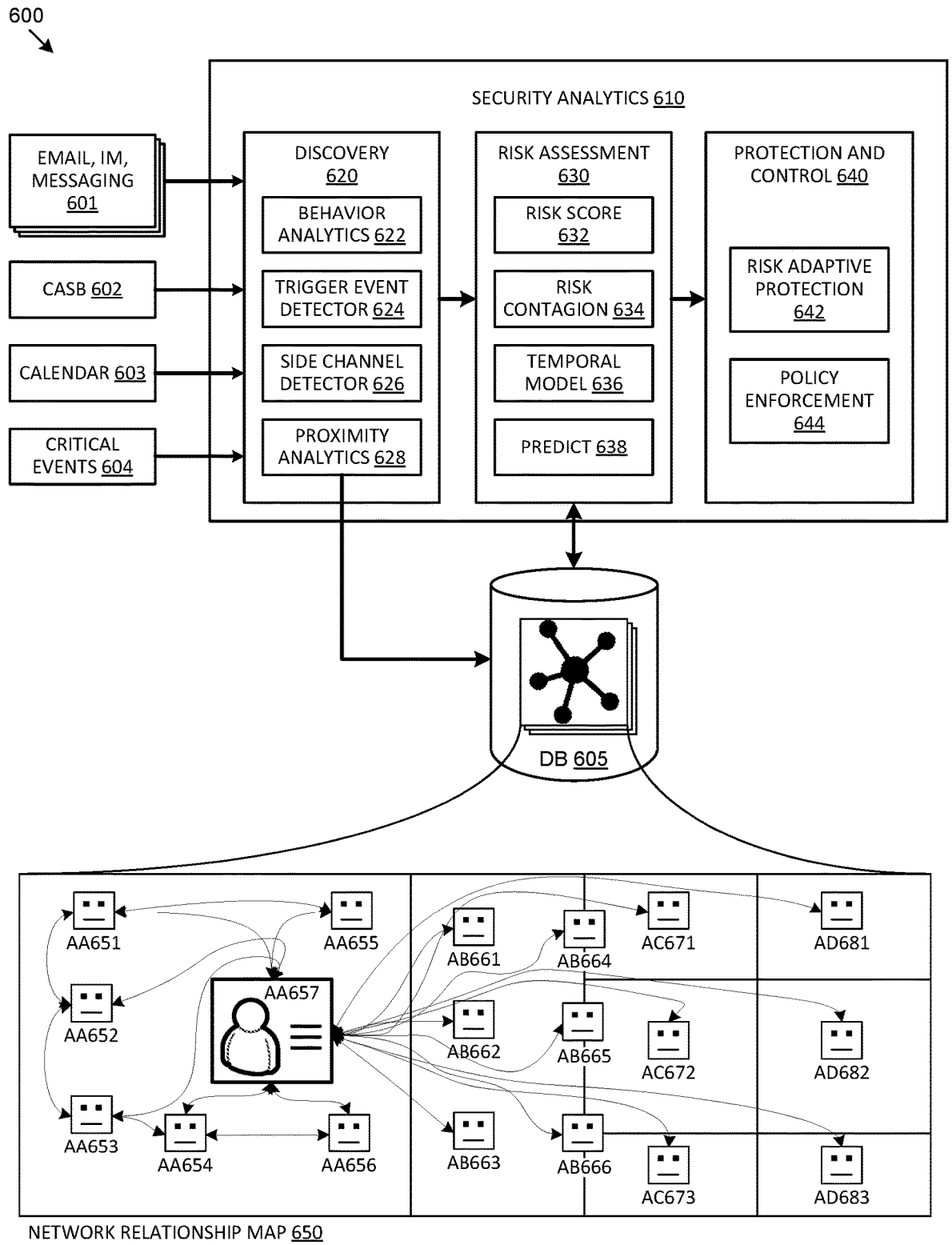
FIG. 6 is a simplified block diagram of a contagion risk analysis system in accordance with selected embodiments of the present disclosure.

To provide additional details for an improved understanding of selected embodiments of the present disclosure, reference is now made to FIG. 6 which is a simplified block diagram of a contagion risk analysis system 600 which is implemented to detect, analyze, and protect against contagion-based risk events in real-time. As disclosed herein, the contagion risk analysis system 600 includes a security analytics system 610 which is connected to evaluate a variety of electronic data and communications inputs 601-604 and to construct a contagion network database 605 where each user (e.g., AA657) is mapped to the corresponding networked connections (e.g., AA651-656, AB661-666, AC671-673, AD681-683) so that risk scores may be assigned based on a "contagion" risk factor for each connection. To this end, the security analytics system 610 includes a discovery module 620, risk assessment module 630, and protection and control module 640 which are used to perform event risk analysis in real-time through the assignment of risk scores to each individual and that individual's networked connections on the basis of risk contagion assessments which enables the system to predict the contagion effects of bad behavior by the individual.

In selected embodiments, the discovery module 620 provides visibility into what applications are being used by employees. For example, the discovery module 620 may be connected and configured to detect and discover contagion networks based on a variety of applications, electronic data and communications inputs, including one or more messaging applications 601, such as the emails, instant messages, or other messaging communications for an individual. For example, the email messages 601 of a first user AA657 will contain email address information for incoming and outgoing messages with a second user AA655, as well as message content, that can be processed using any suitable natural language processing techniques to extract and identify the nature, type, and content of the relationship between the first and second users AA657, AA655. However, email monitoring alone is not sufficient in the current zero-perimeter world wherein cloud-based services, remote work environments, and "bring your own device" behavior can distributed sensitive and proprietary data outside of the corporate work place. For example, text messages, instant messages, or other non-company messaging platforms, such as WHATSAPP, are increasingly used by employees to communicate on work-related matters. Accordingly, the discovery module 620 may be connected to process additional inputs, including data from a Cloud Access Security Broker (CASB) 602, electronic calendar 603, and/or critical events 604. As will be appreciated, a Cloud Access Security Broker 602 is a software tool or service that sits between an organization's on-premises infrastructure and a cloud provider's infrastructure to act as a gatekeeper so that the organization can extend the reach of its security policies beyond its own infrastructure. As such, the CASB 602 may be configured to monitor and capture additional relationship information for the different users AA651-657, AB661-666, AC671-673, AD681-683. Similarly, the electronic calendar inputs 603 for each user may also be mined to capture relationship information (e.g., invited and/or accepted invitations to scheduled events). As will be appreciated, the electronic data and communications inputs 601-604 contain relationship information for the connections between any given individual user (e.g., AA657) and one or more networked connections (e.g., AA651-656, AB661-666, AC671-673, AD681-683).

Using the electronic data and communications inputs 601-604, the discovery module 620 constructs the contagion network database 605 which connects and quantifies the relationships between the networked individuals AA651-657, AB661-666, AC671-673, AD681-683. To this end, the discovery module 620 may include a proximity analytics module 628 which is configured to process user profile information and associated contextual network information for each user to generate a contagion network 605 which identifies the physical, network, logical and/or communication relationships between networked users AA651-657, AB661-666, AC671-673, AD681-683. For example, the proximity analytics module 628 may be configured to identify physical connections between different users, such as being located in the same city or office space or cubicle area in an organization. In addition or in the alternative, the proximity analytics module 628 may be configured to identify network connections between different users, such as being participants in one or more identified work teams, calendared events, and/or email/messaging groups. In addition or in the alternative, the proximity analytics module 628 may be configured to identify logical connections between different users, such as being assigned to the same division or working group at an organization or being hired on the same date or being part of a group of incoming employees being merged into the organization or being eliminated from the organization. In addition or in the alternative, the proximity analytics module 628 may be configured to identify communication connections between different users, such as participants with an identified communication message, channel, platform, or the like. In addition to identifying actual proximity between users, the discovery module 620 may be configured to identify anomalous proximity indicators between users. For example, the proximity analytics module 628 may include one or more anomalous proximity detectors which process the electronic data and communications inputs 601-604 to detect new and unexpected relationships or communications between users which can signify an effort to encourage bad behavior. For example, the proximity analytics module 628 may be configured to detect user communications with other employees at unexpected or unusual levels within the organization, such as when a relatively important employee communicates anomalously with a very low level employee or a very high level employee. In addition or in the alternative, a side channel detector module 626 may be configured to monitor the communication behavior of a first user AA657 to detect the creation of an external or side channel for communicating with one or more fellow employees (e.g., AD682). For example, by detecting a pattern of new activity (e.g., installing new side channel application), the side channel detector module 626 is able to exploit the tendency for bad behavior seek isolation or secrecy from the main group. In addition, the proximity analytics module 628 may be configured to assess the anomalous proximity based the level of company experience for users communicating with other employees, such as when a long-established employee communicates anomalously with a new employee or vice versa.

As disclosed herein, the identified physical, network, logical and/or communication relationship information extracted by the proximity analytics module 628 may be processed by the discovery module 620 to construct the contagion network database 605 using any suitable network generation technique, such as NodeXL which is a free, open source tool for exploring network graphs. As an example contagion network database 605, the network relationship map 650 represents network connections to a first individual or entity AA657, as plotted by NodeXL, using the Harel-Koren Fast Multiscale algorithm, with the layout arranged with the group by cluster function according to the Girvan-Newman clustering algorithm, and with edge width and visibility being mapped to Edge Weight. In the depicted network relationship map 650, information associated with the connection lines between each entity on the network relationship map 650 identify the nature, type, and content of the relationships between each of the networked users AA651-657, AB661-666, AC671-673, and AD681-683. However, it will be appreciated that the amount of contagion may depend on not just the connection, but may also depend on other facts about the connection. Consider, for example, a first user AA657 who is unhappy in his or her job. If the first user AA657 talks frequently with work team colleagues AA651-654 and with another individual AD683 in the company support department, the amount of contagion allocated to the individuals AA651-654 and AD683 is unequal. For example, a higher contagion score might be assigned to the individual AD683 in the company support department since that individual would have a higher risk of being impacted as compared to the work team colleagues AA651-654 who talk a lot about work-related matters. In this way, the potential level of influence or "contagion" between users may be quantified.

In addition to generating the contagion network database 605, the discovery module 620 is connected and configured to evaluate the electronic data and communications inputs 601-604 for purposes of identifying high risk behavior by a user (e.g., AA657) and other contagion-related users identified in the contagion network database 605 in response to one or more risk assessment trigger events. To this end, the discovery module 620 may include a behavior analytics module 622 which is configured to process a user profile with associated contextual information to generate correlated contextual information to determine the user's mental state at a particular point in time. In certain embodiments, the mental state of a user at a particular point in time may be used in combination with various user profile attributes and user behavior factors, in the context of an associated user state, to infer information about the user, such as the user's intent, sentiment toward the company, and other information that is not directly knowable. In selected embodiments, the behavior analytics module 622 enables security teams to proactively protect company data by identifying high risk behavior inside the enterprise by fusing structured and unstructured data to identify and disrupt malicious, compromised and negligent users.

In addition, the discovery module 620 may include a trigger event detector 624 which is configured to process the electronic data and communications inputs, such as the critical events 604, to identify trigger events as behavior events that should prompt an updating of the contagion network database 605 or otherwise merit an activation of the risk assessment module 630. Examples of such critical events 604 include, but are not limited to, the hiring of an individual to join the organization, the firing of an individual from the organization, a merger and acquisition event at the organization, or other significant company events, such as reorganizations, work force reduction, stock offerings, etc. In selected embodiments, the trigger event detector 624 may be embodied with a controller which receives and processes one or more inputs 601-604 to automatically detect a risk assessment trigger event, such as the firing of an "influential" employee or the creation of a new side channel by the "influential" employee for communicating with other employees. In addition or in the alternative, the trigger event detector 624 may be embodied to implement machine learning techniques to determine a causal sequence from among the electronic data and communications inputs 601-604 which identifies a risk assessment trigger event.

Once triggered by the discovery module 620, the security analytics system 610 uses the contagion network database 605 to perform an event risk analysis in real-time on events performed by an entity, to assign corresponding risk scores to each individual and that individual's networked connections on the basis of risk contagion assessments, and to predict the contagion effects of bad behavior "events" by the individual and that individual's networked connections. To this end, the discovery module 620 may include a risk assessment module 630 which assesses the contextual risk of applications, users, and security configurations using a risk score module 632, risk contagion module 634, temporal model 636, and prediction module 638 which may be implemented to perform a risk assessment of certain triggering events by processing entity information associated with an event. As disclosed herein, an event broadly refers to the occurrence of an action performed by an entity. In certain embodiments, the action may be directly associated with a user behavior that can adversely affect other individuals interacting with the user, with the adverse contagion effects on newly introduced individuals typically being more pronounced than the positive contagion effects on newly introduced individuals. As a non-limiting example, there is a "woes attract foes" principle—where people who might feel badly toward a company tend to clump together and feed off each other—that may be used to determine the contagion effects from a user's behavior. With a new group of individuals who are exposed to "negative" user behavior or bad habits when first introduced to the user, the adverse contagion effects on the new group is more powerful than the positive contagion effects of the user's good behavior. In another example, a first user may attach a binary file infected with a virus to an email that is subsequently sent to a second user. In this example, the act of attaching the binary file to the email is directly associated with a user behavior enacted by the first user. In certain embodiments, the action may be indirectly associated with a user behavior. To extend the example, the recipient of the email may open the infected binary file, and as a result, infect their computer with malware. To continue the example, the act of opening the infected binary file is directly associated with a user behavior enacted by the second user. However, the infection of the email recipient's computer by the infected binary file is indirectly associated with the described user behavior enacted by the second user. As likewise used herein, an entity broadly refers to something that exists as itself, whether physically or abstractly. In certain embodiments, an entity may be an individual user, a group, an organization, or a government. In certain embodiments, an entity may likewise be an item, a device, such as endpoint and edge devices, a network, a domain, an operation, or a process. In certain embodiments, an entity may be a resource, such as a geographical location or formation, a physical facility, a venue, a system, a data store, or a service, such as a service operating in a cloud environment.

To compute a risk score for an event performed by a first entity or individual, the risk assessment module 630 may include a risk score module 632 which is configured to compute a security risk score for an event or action. In operation, the risk score module 632 may be configured to process certain entity information associated with an event to analyze a risk score or probability. As used herein, entity information broadly refers to information that can be used to ascertain or corroborate the identity of an entity and its associated behavior, whether the behavior occurs within a physical realm or cyberspace. In certain embodiments, entity information may include user profile attributes, user behavior factors, or user mindset factors, described in greater detail herein. In various embodiments, entity information may include certain types of content. In certain embodiments, such content may include text, unstructured data, structured data, graphical images, photographs, audio recordings, video recordings, biometric information, and so forth. In certain embodiments, the entity information may include metadata. In certain embodiments, the metadata may include entity attributes, which in turn may include certain entity identifier types or classifications.

In various embodiments, the risk score module 632 may be implemented to use certain entity identifier information to ascertain the identity of an associated entity at a particular point in time. As used herein, entity identifier information broadly refers to an information element associated with an entity that can be used to ascertain or corroborate the identity of its corresponding entity at a particular point in time. In certain embodiments, the entity identifier information may include user authentication factors, user profile attributes, user behavior factors, user mindset factors, information associated with various endpoint and edge devices, networks, resources, or a combination thereof.

In certain embodiments, the entity identifier information may include temporal information derived from the temporal model 636. As used herein, temporal information broadly refers to a measure of time (e.g., a date, timestamp, etc.), a measure of an interval of time (e.g., a minute, hour, day, etc.), or a measure of an interval of time (e.g., between Jun. 3, 2017 and Mar. 4, 2018, etc.). In certain embodiments, the temporal information may be associated with an event associated with a particular point in time. As used herein, such a temporal event broadly refers to an occurrence, action or activity enacted by, or associated with, an entity at a particular point in time. Examples of such temporal events include making a phone call, sending a text or an email, using a device, such as an endpoint device, accessing a system, and entering a physical facility. Other examples of temporal events include uploading, transferring, downloading, modifying, or deleting data, such as data stored in a data store, or accessing a service. Yet other examples of temporal events include interactions between two or more users, interactions between a user and a device, interactions between a user and a network, and interactions between a user and a resource, whether physical or otherwise. Yet still other examples of temporal events include a change in name, address, physical location, occupation, position, role, marital status, gender, association, affiliation, or assignment. As likewise used herein, temporal event information broadly refers to temporal information associated with a particular event. In various embodiments, the temporal event information may include certain types of content. In certain embodiments, such types of content may include text, unstructured data, structured data, graphical images, photographs, audio recordings, video recordings, and so forth. In certain embodiments, the entity information may include metadata. In various embodiments, the metadata may include temporal event attributes, which in turn may include certain entity identifier types or classifications, described in greater detail herein.

As disclosed herein, the risk score module 632 may compute a probability distribution function which quantifies a risk for an event performed by an entity. In certain embodiments, the probability distribution function may be implemented as a probability density function, a probability mass function, or a cumulative distribution function. A sample space, as likewise used herein, broadly refers to the set of all possible outcomes of a particular phenomenon being observed. In certain embodiments, the phenomenon being observed may be an event or any other phenomenon being observed as a matter of design choice. By computing a probability density function (PDF), or density of a continuous random variable, the risk score module 632 quantifies a function whose value at any given sample within a particular sample space can be interpreted as providing a relative likelihood that the value of the random variable would equal that sample. A probability mass function (PMF), as used herein, broadly refers to a function that gives the probability that a discrete random variable is exactly equal to a particular value. A cumulative distribution function (CDF), as likewise used herein, broadly refers to a function whose value is the probability that a corresponding continuous random variable, described in greater detail herein, has a value less than or equal to the argument of the function.

In certain embodiments, one or more probability distribution functions may be implemented to describe the distribution of multivariate random variables. In certain embodiments, one or more probability distribution functions may be implemented to determine the relative unlikelihood that the value of a random variable would equal a particular sample. In certain embodiments, the relative unlikelihood that the value of a random variable would equal a particular sample may be classified as an outlier. In certain embodiments, the method by which a particular sample may be classified as an outlier is a matter of design choice. As an example, a particular sample that is more than two standard deviations from the mean of a PDF distribution may be considered to be an outlier. Likewise, a particular sample that is more than one standard deviation from the mean of a PDF distribution may be considered to be an outlier.

As disclosed herein, the risk score module 632 may compute a risk score for a feature associated with a corresponding event. In certain embodiments, such a feature may be associated with anomalous, abnormal, unexpected or malicious user behavior. In certain embodiments, the occurrence of an unlikely feature associated with a particular entity may result in the generation of a corresponding risk score. In certain embodiments, the generation of a corresponding risk score may include computing the aggregation of occurrences of certain unlikely features with which an entity may be associated. In certain embodiments, the resulting risk score may be assigned, or otherwise associated, with the entity associated with the occurrence of an unlikely feature. In certain embodiments, the assigned risk score may be implemented to reflect a security risk corresponding to the entity associated with the occurrence of the unlikely feature. In certain embodiments, multiple occurrences of an unlikely feature within a particular period of time may increase an assigned risk score.

In addition to computing a risk score for a specific event performed by a first individual or entity (e.g., AA657), the risk assessment module 630 may include a risk contagion module 634 which assigns or propagates contagion-based risk scores for events based on computed risk probabilities for each event to each individual and that individual's networked connections based on the degree of influence or "contagion" specified in the contagion network database 605. In addition to propagating event-based risk scores, the risk contagion module 634 may propagate inference-based risk scores that are derived from others and/or from the different underlying entity risk scores. For example, a first individual or entity (e.g., AA657) may be identified in the contagion network 605 as having a first, relatively high degree of influence on a first set of closely associated entities (e.g., AA651-656) by virtue of their physical, network, logical and/or communication proximity to one another. In this case, the risk contagion module 634 may be configured to assign a first propagated risk score to the first set of closely associated entities, such as by applying a first scaling factor (e.g., 0.9) to the risk score computed for the first entity. However, for a second set of associated entities (e.g., AB661-666) which have a second, smaller degree of influence with respect to the first individual or entity (e.g., AA657), the risk contagion module 634 may be configured to assign a second propagated risk score to the second set of associated entities, such as by applying a second scaling factor (e.g., 0.6) to the risk score computed for the first entity. In similar fashion, the risk contagion module 634 may be configured to assign diminishing propagated risk scores to different sets of associated entities based on their relative degree of influence with the respect to the first entity, such as by applying a third scaling factor (e.g., 0.2) to the risk score computed for the first entity when assigning propagated risk scores to the least closely associated entities (e.g., AD681-683).

In addition to computing and allocating contagion-based risk scores to entities in the contagion network 605, the risk assessment module 630 may include a prediction module 638 which uses the computed risk scores associated with a particular entity to predict events for use in generating an adaptive response by the protection and control module 640. In certain embodiments, the prediction module 638 may be implemented to predict one or more security risk events based on forensic analysis of email/message data which is mined to detect upcoming risk events. In addition or in the alternative, the prediction module 638 may be implemented to predict one or more security risk events based on one or more trigger events, such as preparations to merge or join business groups, hiring or departure events, pre-merger analysis for merger and acquisition events, or the like. In selected embodiments, the prediction of a security risk threat by any of the entities AA651-657, AB661-666, AC671-673, AD681-683 in the network relationship map 650 may be determined on the basis of the risk score for any entity exceeding a trigger or threshold value and/or on the basis of the strength, type, and/or nature of any connection relationship between entities. As will be appreciated, multivariant risk factor prediction may be separately evaluated for each of a plurality of entity behaviors, with different triggering thresholds being applied for different behaviors. Thus, each event prediction generated by the prediction module 638 may take into account the likelihood that a risk event for a first entity is not contagious for other entities based on triggering threshold requirements, strength of relationship metrics, type of relations metrics, or the like.

Once a predicted security risk is identified by the risk assessment module 630, the security analytics system 610 automatically prevents and controls identified security threats by applying context-aware policy enforcement. To this end, a protection and control module 640 provides access control and data protection with a risk adaptive protection module 642 and policy enforcement module 644 which may be implemented to automatically respond to contagion-based event risk scores in order to reduce operational overhead and improve system efficiency while maintaining security integrity. In selected embodiments, the risk adaptive protection module 642 may be configured to automatically prevent an entity having a minimum security risk score from performing an event or action and/or otherwise dynamically protect data. Built to address a variety of complex and sophisticated security threats, the risk adaptive protection module 642 is configured to continuously assess risk and automatically provide proportional enforcement that can be dialed up or down in response to changing risk levels. This capability is enabled through the power of human-centric behavior analytics that understand interactions with data across users, machines and accounts. Intelligent context speeds decision-making and security controls specific to changing risk in enterprise networks. Instead of applying broad sweeping rules, the risk adaptive protection module 642 applies behavior-centric analytics to each individual or entity which has a unique and variable risk level that can dynamically change based on user behavior and interaction with data.

As part of the risk adaptive protection performance, the security analytics system 610 may also automatically enforce security policies by applying context-aware policy enforcement. To this end, a policy enforcement module 644 provides dynamic data protection to surface anomalies, and proactively adjust individualized data security controls in near real-time to protect your data, thereby improving deterrence of data loss events. In selected embodiments, the automated policy enforcement module 644 may be configured to automatically enforce policies with graduated responses. In this way, the protection and control module 640 may allow behaviors for low-risk individuals and take stronger action as risk levels are elevated. As a result of automating the policy enforcement, manual decision-making and overall alert volumes are reduced for the security analytics module 610.

In addition or in the alternative to automated protection and control, the access control and data protection responses to predicted security risks may be performed by a security administrator. Accordingly, certain embodiments of the invention may be directed towards assessing the risk associated with the affirmative resolution of the identity of an entity at a particular point in time in combination with its associated contextual information. Consequently, the probability distribution analysis system may be more oriented in various embodiments to risk adaptation than to security administration.

Figure 7:
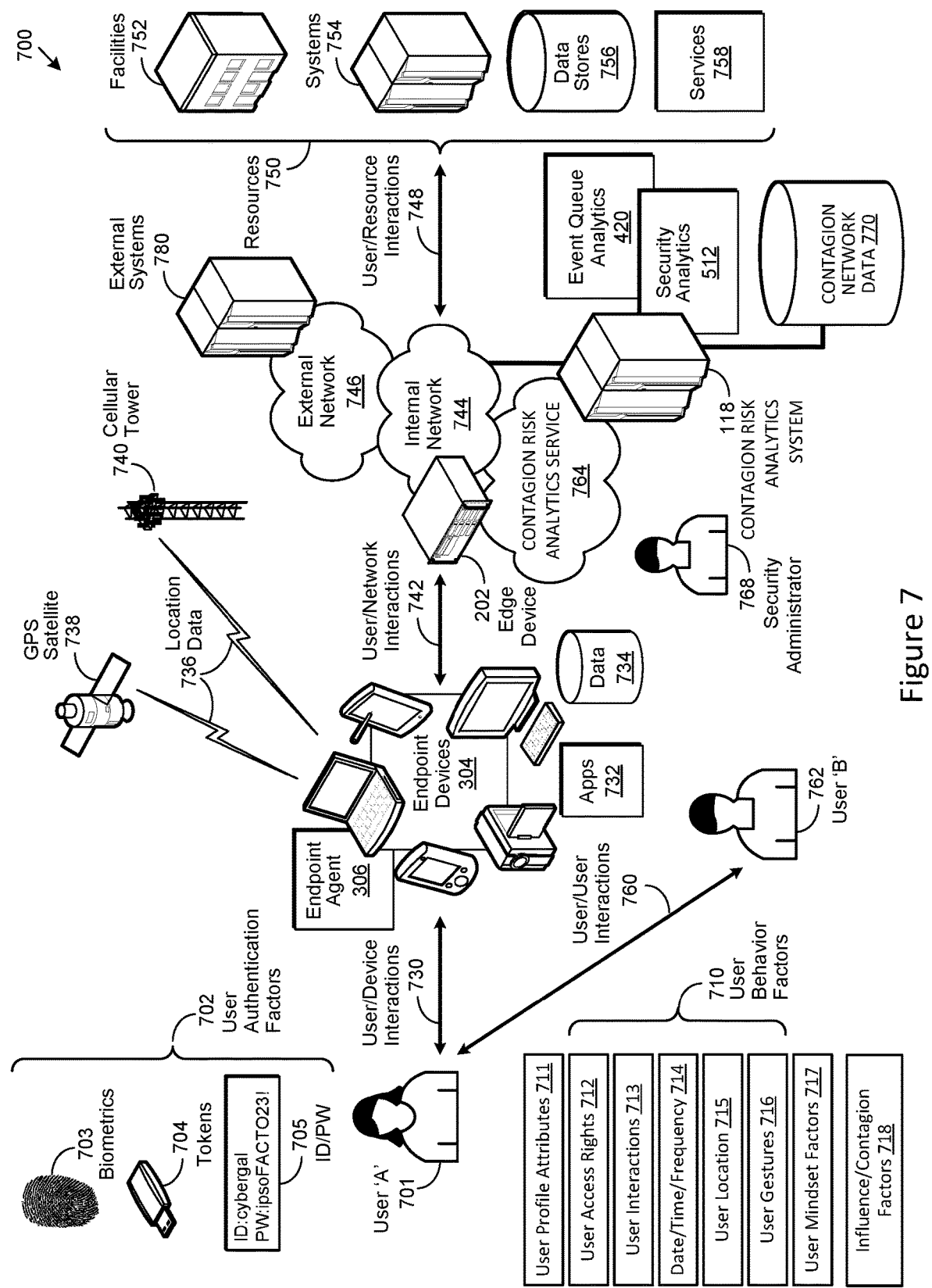
FIG. 7 is a simplified block diagram of the operation of a contagion risk analysis system in accordance with selected embodiments of the present disclosure.

To provide additional details for an improved understanding of selected embodiments of the present disclosure, reference is now made to FIG. 7 which is a simplified block diagram of the operation of a contagion risk analysis system 700. In the depicted embodiment, the contagion risk analysis system 700 may be implemented to automatically detect, analyze, and protect against contagion-based risk events in real-time. In certain embodiments, such events may be associated with one or more users, such as first user 'A' 701 or a second networked user 'B' 762. In certain embodiments, analyses performed by the contagion risk analysis system 700 may be used to identify anomalous, abnormal, unexpected or malicious behavior associated with a user at a particular point in time (e.g., during the occurrence of an event, the enactment of a user behavior, or a combination thereof), and to evaluate the events for a risk score which is then propagated to other users (e.g., 762) based on the level of influence or contagion computed for the users 701, 762 derived from the user/user interactions 760 therebetween which are captured and stored in the contagion network data 770.

In certain embodiments, information associated with such user behavior may be stored in a user profile. As used herein, a user profile broadly refers to a collection of information that uniquely describes a user's identity and their associated behavior, whether the behavior occurs within a physical realm or cyberspace. In certain embodiments, as described in greater detail herein, the user profile may include user profile attributes 711, user behavior factors 710, user mindset factors 717, one or more influence or contagion factors 718, and/or a combination thereof.

As used herein, a user profile attribute 711 broadly refers to data or metadata that can be used to uniquely ascertain the identity of a user. In certain embodiments, the user profile attributes 711 may include certain personal information, including but not limited to non-sensitive personal information associated with a user, such as their name, title, position, role, and responsibilities. In addition or in the alternative, the personal information may likewise include technical skill level information, peer information, expense account information, paid time off (PTO) information, data analysis information, insider information, misconfiguration information, third party information, or a combination thereof. In addition or in the alternative, the personal information may contain sensitive personal information associated with a user. As used herein, sensitive personal information (SPI), also commonly referred to as personally identifiable information (PII), broadly refers to any information usable to ascertain the identity of a user, either by itself, or in combination with other information, such as contextual information described in greater detail herein. Examples of SPI may include the full or legal name of a user, initials or nicknames, place and date of birth, home and business addresses, personal and business telephone numbers, their gender, and other genetic information. Additional examples of SPI may include government-issued identifiers, such as a Social Security Number (SSN) or a passport number, vehicle registration plate and serial numbers, and driver's license numbers. Other examples of SPI may include certain email addresses and social media identifiers, credit and debit card numbers, and other digital identity information. Yet other examples of SPI may include employer-issued identifiers, financial transaction information, credit scores, electronic medical records (EMRs), insurance claim information, personal correspondence, and so forth. Further examples of SPI may include user authentication factors 804, such as biometrics 806, tokens 808, user identifiers and passwords 810, and personal identification numbers (PINs).

In selected embodiments, one or more user authentication factors 702 may be used to authenticate the identity of a user, such as user 'A' 701 or 'B' 762. In certain embodiments, the user authentication factors 702 may be used to ensure that a particular user is associated with their corresponding user profile, rather than a user profile associated with another user. As will be appreciated, the user authentication factors 702 may include a user's biometric data 703, an associated security token 704, (e.g., a dongle containing cryptographic keys), and/or a user identifier/password (ID/PW) 705. However selected, the user authentication factors 702 may be used in combination to perform multi-factor authentication of a user, such as user 'A' 701 or 'B' 762. As used herein, multi-factor authentication broadly refers to approaches requiring two or more authentication factors. In general, multi-factor authentication includes three classes of user authentication factors 702. The first is something the user knows, such as a user ID/PW 705. The second is something the user possesses, such as a security token 704. The third is something that is inherent to the user, such as a biometric 703. As will be appreciated, multi-factor authentication may be extended to include a fourth class of factors, which includes one or more user behavior factors 710, or portions thereof. In these embodiments, the fourth class of factors may include user behavior the user has previously enacted, is currently enacting, or is expected to enact at some point in the future. In certain embodiments, the enactment of a user behavior may be associated with a particular event. In certain embodiments, multi-factor authentication may be performed on recurring basis. In various embodiments, the multi-factor authentication may be performed at certain time intervals during the enactment of a particular user behavior. In certain embodiments, the time interval may be uniform. In certain embodiments, the time interval may vary or be random.

As disclosed herein, the multi-factor authentication may be performed according to the occurrence of an event or the enactment of a particular user behavior, such as accessing a resource 750. In various embodiments, certain combinations of the multi-factor authentication described herein may be used according to the enactment of a particular user behavior. From the foregoing, those of skill in the art will recognize that the addition of such a fourth class of factors not only strengthens current multi-factor authentication approaches, but further, allows the factors to be more uniquely associated with a given user and their corresponding user profile.

As will be appreciated, it is not uncommon for hackers, criminals and other actors to use various SPI to impersonate a user in order to gain unauthorized access to various systems, data, or facilities. It is likewise not uncommon for such individuals to masquerade as a user in order to collect their associated SPI for the purpose of identity theft. One known approach to gathering a user's SPI is to illicitly capture a data stream, such as a flow of network packets that include SPI sent by a user to another machine, such as an external system 780. Defenses against such approaches include encrypting the data stream prior to its communication across a network, such as the internal network 744 or external network 746. In addition, approaches, such as the use of a key logger, may surreptitiously capture the user's keystrokes or user gestures 716 and communicate the resulting data stream in their native form to a hacker or other infiltrator. Another issue is the possibility that a normally-trusted insider, such as a security administrator 768, may have access to a decrypted data stream as part of their day-to-day responsibilities. As an example, a security administrator 768 may be using a security analytics 512 system to perform threat analysis related to a particular user. In the process, they may be exposed to various SPI associated with the user, such as certain user IDs and passwords 705. It will be appreciated that such exposure creates the opportunity for a security breach, whether intended or not. Another approach is to impersonate a legitimate website. In such approaches, the user may navigate to the site and innocently enter their ID/password 705, only to have them captured for later use in illegal activities.

As used herein, a user behavior factor 710 broadly refers to information associated with a user's behavior, whether the behavior occurs within a physical realm or cyberspace. In certain embodiments, user behavior factors 710 may include the user's access rights 712, the user's interactions 713, and the date/time/frequency 714 of when the interactions 713 are enacted. In certain embodiments, the user behavior factors 710 may likewise include the user's location 715, and the gestures 716 used to enact the user interactions 713. In certain embodiments, the user gestures 716 may include key strokes on a keypad, a cursor movement, a mouse movement or click, a finger swipe, tap, or other hand gesture, an eye movement, or some combination thereof. In certain embodiments, the user gestures 716 may likewise include the cadence of the user's keystrokes, the motion, force and duration of a hand or finger gesture, the rapidity and direction of various eye movements, or some combination thereof. In certain embodiments, the user gestures 716 may include various audio or verbal commands performed by the user.

In various embodiments, certain date/time/frequency 714 behavior factors 710 may be implemented as ontological or societal time, or a combination thereof. As used herein, ontological time broadly refers to how one instant in time relates to another in a chronological sense. As an example, a first user behavior enacted at 12:00 noon on May 17, 2017 has occurred prior to a second user behavior enacted at 6:39 PM on May 18, 2018. Skilled practitioners of the art will recognize one value of ontological time is to determine the order in which various user behaviors have been enacted. As likewise used herein, societal time broadly refers to the correlation of certain user profile attributes 711, user behavior factors 710, user mindset factors 717, or a combination thereof, to one or more instants in time. As an example, user 'A' 701 may access a system 754 to download a customer list at 3:47 PM on Nov. 3, 2017. Analysis of their user behavior profile indicates that it is not unusual for user 'A' 701 to download the customer list on a weekly basis. However, examination of their user behavior profile also indicates that user 'A' 701 forwarded the downloaded customer list in an email message to user 'B' 762 at 3:49 PM that same day. Furthermore, there is no record in their user behavior profile that user 'A' 701 has ever communicated with user 'B' 762 in the past. Moreover, it may be determined that user 'B' 762 is employed by a competitor. Accordingly, the correlation of user 'A' 701 downloading the customer list at one point in time, and then forwarding the customer list to user 'B' 762 at a second point in time shortly thereafter, is an example of societal time.

In a variation of the prior example, user 'A' 701 may download the customer list at 3:47 PM on Nov. 3, 2017. However, instead of immediately forwarding the customer list to user 'B' 762, user 'A' 701 leaves for a two week vacation. Upon their return, they forward the previously-downloaded customer list to user 'B' 762 at 9:14 AM on Nov. 20, 2017. From an ontological time perspective, it has been two weeks since user 'A' 701 accessed a system 754 to download the customer list. However, from a societal time perspective, they have still forwarded the customer list to user 'B' 762, despite two weeks having elapsed since the customer list was originally downloaded.

Accordingly, the correlation of user 'A' 701 downloading the customer list at one point in time, and then forwarding the customer list to user 'B' 762 at a much later point in time, is another example of societal time. More particularly, it may be inferred that the intent of user 'A' 701 did not change during the two weeks they were on vacation. Furthermore, user 'A' 701 may have attempted to mask an intended malicious act by letting some period of time elapse between the time they originally downloaded the customer list and when they eventually forwarded it to user 'B' 762. From the foregoing, those of skill in the art will recognize that the use of societal time may be advantageous in determining whether a particular user behavior is acceptable, anomalous, abnormal, unexpected or malicious.

As used herein, mindset factors 717 broadly refer to information used to determine the mental state of a user at a particular point in time, during the occurrence of an event or an enactment of a user behavior, or combination thereof. As used herein, mental state broadly refers to a hypothetical state corresponding to the way a user may be thinking or feeling. In certain embodiments, the user mindset factors 717 may include a personality type. Examples of known approaches for determining a personality type include Jungian types, Myers-Briggs type indicators, Keirsy Temperament Sorter, Socionics, Enneagram of Personality, and Eyseneck's three-factor model. In certain embodiments, the mindset factors 717 may include various behavioral biometrics. As likewise used herein, a behavioral biometric broadly refers to a physiological indication of a user's mental state. Examples of behavioral biometrics may include a user's blood pressure, heartrate, respiratory rate, eye movements and iris dilation, facial expressions, body language, tone and pitch of voice, speech patterns, and so forth.

Certain embodiments of the invention reflect an appreciation that certain user behavior factors 710, such as user gestures 716, may provide additional information related to determining a user's mental state. As an example, a user entering text at a quick pace with a rhythmic cadence may indicate intense focus. Likewise a user intermittently entering text with forceful keystrokes may indicate the user is in an agitated state. As another example, the user may intermittently enter text somewhat languorously, which may indicate being in a thoughtful or reflective state of mind. As yet another example, the user may enter text with a light touch with an uneven cadence, which may indicate the user is hesitant or unsure of what is being entered.

Certain embodiments of the invention likewise reflect an appreciation that while the user gestures 716 may indicate the mental state of a user, they may not provide the reason for the user to be in a particular mental state. Likewise, certain embodiments of the invention include an appreciation that certain user gestures 716 and behavioral biometrics are reflective of a user's personality type. As an example, aggressive, forceful keystrokes combined with an increased heart rate may indicate normal behavior for a particular user when composing end-of-month performance reviews. In various embodiments, certain user behavior factors 710, such as user gestures 716, may be correlated with certain contextual information.

As used herein, contextual information broadly refers to any information, directly or indirectly, individually or in combination, related to a particular user behavior. In certain embodiments, user behavior may include a user's physical behavior, cyber behavior, or a combination thereof. As likewise used herein, a user's physical behavior broadly refers to any user behavior occurring within a physical realm, such as speaking, gesturing, facial patterns or expressions, walking, and so forth. More particularly, such physical behavior may include any action enacted by a user that can be objectively observed, or indirectly inferred, within a physical realm. In certain embodiments, the objective observation, or indirect inference, of the physical behavior may be performed electronically.

As an example, a user may attempt to use an electronic access card to enter a secured building at a certain time. In this example, the use of the access card to enter the building is the action and the reading of the access card makes the user's physical behavior electronically-observable. As another example, a first user may physically transfer a document to a second user, which is captured by a video surveillance system. In this example, the physical transferal of the document from the first user to the second user is the action. Likewise, the video record of the transferal makes the first and second user's physical behavior electronically-observable. As used herein, electronically-observable user behavior broadly refers to any behavior exhibited or enacted by a user that can be observed through the use of an electronic device (e.g., an electronic sensor), a computing device or system (e.g., an endpoint device 304), computer instructions (e.g., a software application), or a combination thereof.

Cyber behavior, as used herein, broadly refers to any behavior occurring in cyberspace, whether enacted by an individual user, a group of users, or a system acting at the behest of an individual user, a group of users, or an entity. More particularly, cyber behavior may include physical, social, or mental actions that can be objectively observed, or indirectly inferred, within cyberspace. As an example, a user may use an endpoint device 304 to access and browse a particular website on the Internet. In this example, the individual actions performed by the user to access and browse the website constitute a cyber behavior. As another example, a user may use an endpoint device 304 to download a data file from a particular system at a particular point in time. In this example, the individual actions performed by the user to download the data file, and associated temporal information, such as a time-stamp associated with the download, constitute a cyber behavior. In these examples, the actions are enacted within cyberspace, in combination with associated temporal information, which makes them electronically-observable.

As likewise used herein, cyberspace broadly refers to a network environment, such as an internal network 744 or external network 746, capable of supporting communication between two or more entities. In certain embodiments, the entity may be a user, an endpoint device 304, or various resources, described in greater detail herein. In certain embodiments, the entities may include various endpoint devices 304 or resources 750 operating at the behest of an entity, such as a user. In certain embodiments, the communication between the entities may include audio, image, video, text, or binary data.

In certain embodiments, the contextual information may include a user's authentication factors 702. In certain embodiments, contextual information may likewise include various user identity resolution factors, such as personal information associated with the user, the date/time/frequency 714 of various user behavior, the user's location 715, the user's role or position in an organization, their associated access rights 712, and certain user gestures 716 employed by the user in the enactment of a user behavior. Other contextual information may likewise include various user interactions, whether the interactions are with an endpoint device 304, a network 140, a resource 750, or another user. In certain embodiments, user behaviors, and their related contextual information, may be collected at particular points of observation, and at particular points in time, described in greater detail herein.

In certain embodiments, a user profile may be processed with associated contextual information to generate correlated contextual information. In certain embodiments, the correlated contextual information, along with a user's user profile, may be used to perform certain user behavior analysis. In certain embodiments, the user behavior analysis may be performed by the security analytics system 512. In certain embodiments, the security analytics system 512 may be implemented to process a user profile and certain correlated contextual information associated with a user to determine their mental state at a particular point in time. In certain embodiments, the mental state of a user at a particular point in time may be used in combination with various user profile attributes 711 and user behavior factors 710, in the context of an associated user state, to infer a user's intent.

In certain embodiments, a user profile may be used with a first set of contextual information to determine the user's mental state at a first point in time and a second set of contextual information to determine their mental state at a second point in time. In certain embodiments, the user's mental state at a first point in time may correspond to the occurrence of a first user event and the user's mental state at a second point in time may correspond to the occurrence of a second user event. Certain embodiments of the invention reflect an appreciation that such a first and second set of contextual information may be decidedly different, which may provide context for the user's mental state at different times and during the occurrence of different user events. Likewise, the first and second set of contextual information may be substantively the same, which may provide an indication that while the user's mental state may be different at two points in time, or during the occurrence of two different user events, the cause of their mental state may not be related to the contextual information that was collected at the two points in time.

It will be appreciated that over time, the user behavior of a particular user, such as user 'A' 701, will be uniquely different and distinct from another user, such as user 'B' 762. Accordingly, user profile '1' will uniquely reflect the user behavior of user '1', just as user profile 'n' will uniquely reflect the user behavior of user 'n'. As an example, user 'A' 701 may have a user profile attribute 711 of sales administrator. Upon arriving at their office in the morning, the user consistently checks their email, item by item, responding to each in turn, followed by processing expense reports for field sales personnel. Then, after lunch, the user may access and review sales forecasts on an internal system 754. Furthermore, the user may exhibit sporadic keyboard entry interspersed with extensive mouse activity, or user gestures 716, when perusing the sales forecasts. Moreover, personality type information associated with user 'A' 701 may indicate the user consistently exhibits a positive, outgoing attitude. In this example, the sequence of the activities enacted by user 'A' 701 throughout the day, and their frequency, correspond to their expected date/time/frequency 714 from the user behavior factors 710. Likewise, the keyboard cadence and other user gestures 716 are examples of granular user behavior factors 710, while the personality type information is an example of an abstract user behavior factor 710.

As another example, user 'B' 762 may have a user profile attribute 711 of financial controller. Upon arriving at their office in the morning, the user usually scans their email messages, responding only to those that are urgent. Then they check the daily budget status of each department to see whether they are conforming to their respective guidelines. After lunch, the user may follow up on emails that are less urgent, followed by updating the organization's financials, likewise on an internal system 754. Additionally, user 'B' 762 may exhibit deliberate keyboard entry interspersed with iterative mouse activity, or user gestures 716, when updating financial information. Moreover, personality type information associated with user 'B' 762 may indicate they consistently exhibit a reserved, introspective and contemplative attitude. As in the prior example, the sequence of the activities enacted by user 'B' 762 throughout the day, and their frequency, correspond to their expected date/time/frequency 714 user behavior factors 710. Likewise, as before, the keyboard cadence and other user gestures 716 are examples of granular user behavior factors 710, while the personality type information is an example of an abstract user behavior factor 710.

It will likewise be appreciated that the user behavior of a particular user may evolve over time. As an example, certain user behavior exhibited by a user during the first month of assuming a new position within an organization may be quite different than the user behavior exhibited after being in the position for six months. To continue the example, the user may be somewhat tentative when learning to access and interact with unfamiliar resources 750 in the first month in the position, but by the sixth month, such access and interaction is commonplace and routine.

In certain embodiments, a user behavior factor 710 associated with a particular user, such as user 'A' 701 or 'B' 762, may be used by the contagion risk analytics service 764 to compare the user's current user behavior to past user behavior for purposes of identifying and scoring risk events that are to be propagated to other users. If the user's current user behavior matches their past user behavior, then the contagion risk analytics service 764 may determine that the user's user behavior is acceptable. If not, then the contagion risk analytics service 764 may determine that the user's user behavior is anomalous, abnormal, unexpected or malicious. However, it will be appreciated that a change in a particular user's user behavior over time may not be anomalous, abnormal, unexpected, or malicious. Instead, it may be acceptable behavior that simply evolves over time as a natural result of day-to-day user/device interactions 730, user/network interaction 742, user/resource interactions 748, or user/user interactions 760. In certain embodiments, the contagion risk analytics service 764 may be implemented to determine whether such changes in a user's user behavior over time are acceptable, anomalous, abnormal, unexpected or malicious. In certain embodiments, a user behavior profile may be implemented in combination with the contagion risk analytics service 764 to make this temporal determination.

It will be also appreciated that anomalous, abnormal, unexpected or malicious user behavior may include inadvertent or compromised user behavior. For example, the user may have innocently miss-entered a request for data that is proprietary to an organization. As another example, the user may be attempting to access confidential information as a result of being compromised. As yet another example, a user may attempt to access certain proprietary data from their home, over a weekend, and late at night. In this example, the user may be working from home on a project with an impending deadline. Accordingly, the contagion risk analytics service 764 can determine that the attempt to access the proprietary data is legitimate, yet still anomalous, abnormal or unexpected as the attempt did not occur during the week, from the user's place of employment, during normal work hours. However, the user behavior may manifest in context with consistent remote access patterns and provide sufficient evidence to determine the nature of the activity.

Likewise, the contagion risk analytics service 764 may determine that the user's user behavior to be malicious. For example, an impostor may be attempting to pose as a legitimate user in an attempt to exploit one or more resources 750. In this example, the attempt to exploit one or more resources 750 is malicious user behavior. As yet still another example, a legitimate user may be attempting to increase their level of access to one or more resources 750. In this example, the user's attempt to increase their level of access may indicate malicious user behavior. To further extend these examples, such resources 750 may include various facilities 752, systems 754, data stores 756, or services 758.

Upon determining that a user's behavior is anomalous, abnormal, unexpected or malicious, the contagion risk analytics service 764 may be implemented to assign a risk score to the user's behavior and then to allocate corresponding risk scores to that user's networked connections on the basis of risk contagion assessments defined in the contagion network data 770. For example, if a first user 'A' 701 is assigned a single or multivariant risk score on the basis of detected anomalous, abnormal, unexpected or malicious behavior, then the contagion risk analytics service 764 may identify one or more additional users (e.g., 'B' 762) who have a quantified "contagion" relationship such that the first user has influence over the one or more additional users (e.g., 'B' 762). On the basis of the strength of the quantified "contagion" relationship, the contagion risk analytics service 764 may assign or propagate risk scores to the one or more additional users. For example, a scaling factor may be applied to the risk score for the first user 'A' 701 for purposes of assigning a scaled risk score to the one or more additional users based on the strength of the quantified "contagion" relationship between the first user 'A' 701 and the one or more additional users (e.g., 762).

Based on the risk scores assigned to each user 702, 762, the contagion risk analytics service 764 may be implemented to block a user from accessing data or performing a requested operation if the risk score exceeds a threshold measure which may be separately defined for different data access or operation requests. In certain embodiments, the contagion risk analytics service 764 may be implemented to modify a request submitted by a user if it is determined the user's risk score for the request indicates the request is anomalous, abnormal, unexpected or malicious. In addition or in the alternative, the contagion risk analytics service 764 may be implemented to modify an outcome. For example, the contagion risk analytics service 764 may encrypt a file when a copy operation or request is detected.

In certain embodiments, the user profile may be implemented as a cyberprofile. A cyberprofile, as used herein, broadly refers to a collection of information that uniquely describes an entity, their associated behavior within cyberspace, and/or inferences about the entity or its associated behavior. In certain embodiments, the contagion risk analytics service 764 may be implemented to use information associated with certain user behavior elements to define and manage a user profile. A user behavior element, as used herein, broadly refers to a discrete element of a user's behavior during the performance of a particular operation, or the occurrence of a particular event, in a physical realm, cyberspace, or a combination thereof. In certain embodiments, such user behavior elements may be associated with a user/device interaction 730, a user/network interaction 742, a user/resource interaction 748, a user/user interaction 760 interaction, or combination thereof.

As an example, user 'A' 701 may use an endpoint device 304 to browse a particular web page on a news site on the Internet. In this example, the individual actions performed by user 'A' 701 to access the web page are user behavior elements that constitute a user behavior. As another example, user 'A' 701 may use an endpoint device 304 to download a data file from a particular system 754. In this example, the individual actions performed by user 'A' 701 to download the data file, including the use of one or more user authentication factors 702 for user authentication, are user behavior elements that constitute a user behavior. In certain embodiments, the user/device interactions 730 may include an interaction between a user, such as user 'A' 701 or 'B' 762, and an endpoint device 304.

In certain embodiments, the user/device interactions 730 may include interaction with an endpoint device 304 that is not connected to a network at the time the interaction occurs. As an example, user 'A' 701 or 'B' 762 may interact with an endpoint device 304 that is offline, using applications 732, accessing data 734, or a combination thereof, it may contain. Those user/device interactions 730, or their result, may be stored on the endpoint device 304 and then be accessed or retrieved at a later time once the endpoint device 304 is connected to the internal network 744 or external network 746.

In certain embodiments, the endpoint device 304 may be used to communicate data through the use of an internal network 744, an external network 746, or a combination thereof. In certain embodiments, the internal network 744 and the external network 746 may include a public network, such as the Internet, a physical private network, a virtual private network (VPN), or any combination thereof. In certain embodiments, the internal network 744 and the external network 746 may likewise include a wireless network, including a personal area network (PAN), based on technologies such as Bluetooth. In various embodiments, the wireless network may include a wireless local area network (WLAN), based on variations of the IEEE 802.11 specification, commonly referred to as WiFi. In certain embodiments, the wireless network may include a wireless wide area network (WWAN) based on an industry standard including various 3G, 4G and 5G technologies.

In certain embodiments, the user/resource interactions 748 may include interactions with various resources 750. In certain embodiments, the resources 750 may include various facilities 752 and systems 754, either of which may be physical or virtual, as well as data stores 756 and services 758. In certain embodiments, the user/user interactions 760 interactions may include interactions between two or more users, such as user 'A' 701 and 'B' 762. In certain embodiments, the user/user interactions 760 may be physical, such as a face-to-face meeting, via a user/device interaction 730, a user/network interaction 742, a user/resource interaction 748, or some combination thereof.

In certain embodiments, the user/user 860 interaction may include a face-to-face verbal exchange between two users. In certain embodiments, the user/user interactions 760 may include a written exchange, such as text written on a sheet of paper, between two users. In certain embodiments, the user/user 860 interactions may include a face-to-face exchange of gestures, such as a sign language exchange, between two users. In certain embodiments, temporal event information associated with various interactions 730, 742, 748, 760 may be collected and used to define and manage a user profile.

In certain embodiments, the contagion risk analytics service 764 may be implemented to observe user behavior at one or more points of observation within a physical domain or cyberspace environment. In certain embodiments, the points of observation may occur during various user interactions, such as user/device interactions 730, user/network interactions 742, user/resource interactions 748, and user/user interactions 760 described in greater detail herein. As an example, a user/user interactions 760 may include an interaction between user 'A' 701 and 'B' 762.

In certain embodiments, the point of observation may include cyber behavior of various kinds within an internal network 744. As an example, the cyber behavior within an internal network 744 may include a user accessing a particular internal system 754 or data store 756. In certain embodiments, the point of observation may include cyber behavior of various kinds within an external network 746. As an example, the cyber behavior within an external network 746 may include a user's social media activities or participation in certain user forums. Those of skill in the art will recognize that many such examples of user/device interactions 730, user/network interactions 742, user/resource interactions 748, and user/user interactions 760 are possible. Accordingly, the foregoing is not intended to limit the spirit, scope or intent of the invention.

In certain embodiments, the contagion risk analytics service 764 may be implemented to process certain contextual information to ascertain the identity of an entity at a particular point in time. In certain embodiments, the contextual information may include location data 736. In certain embodiments, the endpoint device 304 may be configured to receive such location data 736, which is used as a data source for determining the user's location 715.

In certain embodiments, the location data 736 may include Global Positioning System (GPS) data provided by a GPS satellite 738. In certain embodiments, the location data 736 may include location data 736 provided by a wireless network, such as from a cellular network tower 740. In certain embodiments (not shown), the location data 736 may include various Internet Protocol (IP) or other network address information assigned to the endpoint device 304 or edge device 202. In certain embodiments (also not shown), the location data 736 may include recognizable structures or physical addresses within a digital image or video recording.

In certain embodiments, the endpoint devices 304 may include an input device (not shown), such as a keypad, magnetic card reader, token interface, biometric sensor, digital camera, video surveillance camera, and so forth. In certain embodiments, such endpoint devices 304 may be directly, or indirectly, connected to a particular facility 752 or system 754. As an example, the endpoint device 304 may be directly connected to an ingress/egress system, such as an electronic lock on a door or an access gate of a parking garage. As another example, the endpoint device 304 may be indirectly connected to a physical security mechanism through a dedicated security network.

In certain embodiments, the contagion risk analytics service 764 may be implemented as a stand-alone contagion risk analytics system 118. In certain embodiments, the contagion risk analytics system may be implemented as a distributed system. In certain embodiment, the contagion risk analytics system 118 may be implemented as a virtual system, such as an instantiation of one or more virtual machines (VMs). In certain embodiments, the contagion risk analytics system 118 may be implemented to use various contagion network data stored in a repository of persistent event data 770 to detect, analyze, and protect against contagion-based risk events. In particular, the contagion risk analytics system 118 may process contagion network data 770 to detect and discover contagion or influence relationships between individuals based on behavior analytics, to detect and predict risk events by performing risk analysis to assign risk scores to each individual and that individual's networked connections on the basis of risk contagion assessments, and to automatically protect and control against the effects of contagious behavior with specified auto-prevention and policy enforcement tools and/or risk adaptive protection tools, such as dynamic data protection, access limitations, or the like.

Figure 8:
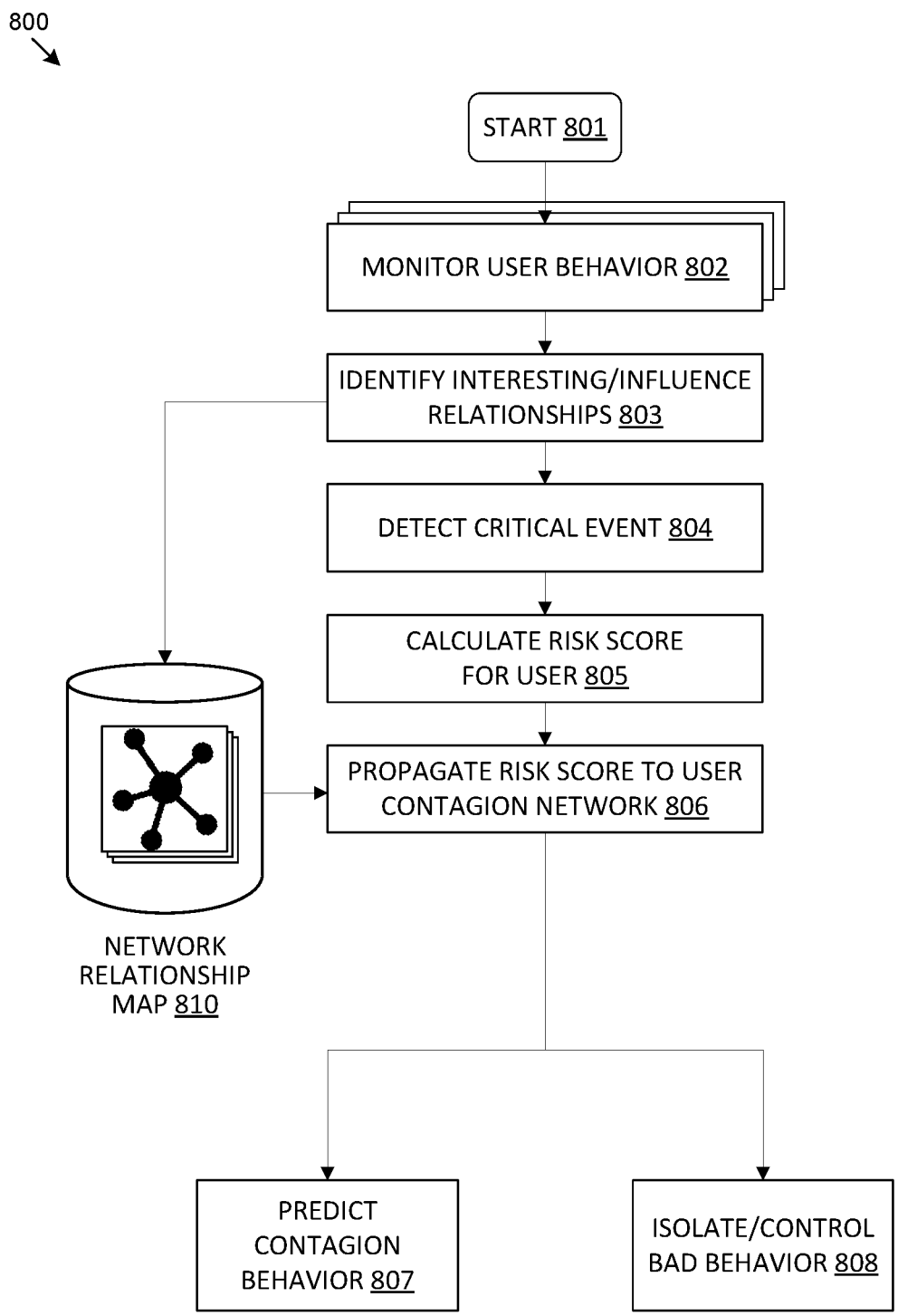
FIG. 8 depicts a simplified flow chart showing the logic for detecting, analyzing, and protecting against contagion-based risk behavior in accordance with selected embodiments of the present disclosure.

To provide additional details for an improved understanding of selected embodiments of the present disclosure, reference is now made to FIG. 8 which depicts a non-limiting example of a simplified flow chart 800 showing the logic for detecting, analyzing, and protecting against contagion-based risk behavior. In the depicted flow diagram 800, the method steps may be performed by programmable software, hardware and/or firmware at the edge device 202 which is controlled by control logic (e.g., at the digital processing subsystem) to construct a network relationship map of contagion or influence relationships between users and to use the network relationship map to propagate risk scores for a user to one or more users in the user's contagion network for purposes of predicting and/or isolating bad behavior initiated by the user. The disclosed methods provide an efficient and accurate method for identifying and controlling anomalous, abnormal, unexpected, or malicious user behavior by propagating security risks from a first user to other users in the organization who may be influenced or affected by the first user. While illustrated with reference to an event-centric embodiment for evaluating and propagating contagion-based risk behavior, it will be appreciated that selected embodiments of the present disclosure may not be event-based, but may be embodied as an inference-based system for evaluating and propagating scores that are derived from others and/or from the different underlying entity risk scores.

After the process starts (step 801), the methodology proceeds to monitor the behavior of one or more users (step 802). In an example embodiment, each user's behavior may be monitored by recording user interactions with other users, devices, networks and/or resources. Using any suitable monitoring technique, the collected user behavior may include user profile data, user access rights data, and other user behavior data, such as user interactions, user location, user interaction date/time/frequency data, user gestures, and user mindset factors. In addition, one or more influence or contagion factors may be collected for each user to help compute or evaluate a level of influence or "contagion" between users.

At step 803, the methodology proceeds to use the monitored user behavior to identify interesting relationships between users which can indicate the influence of one user in relating to another user. For example, a group of individuals who were hired into an organization at the same time may be identified as having influence relationships with one another. Likewise, a group of individuals working on a company project that has been discontinued from the company product line may be identified as having influence relationships with one another. In another example, a group of individuals working on with a group leader who left the company to start a competitive business may be identified as having influence relationships with one another. In yet another example, a group of individuals who set up a new side channel for communicating with one another may be identified as having interesting or influence relationships with one another. Using any suitable learning network structure, the identified influence or contagion relationships may be used to construct and store a network relationship map 810. For example, the network relationship map 810 may be embodied as a directed graph or tree network that is learned or constructed as a graph set of vertices (representing users) and connection paths (representing influence relationships between users).

At step 804, the methodology proceeds to detect critical events by one of the users. In an example embodiment, a discovery service in the contagion risk analytics service may be configured to process the electronic data and communications inputs to identify critical behavior events that should be assessed for a security risk. Examples of critical behavior events may include, but are not limited to the hiring of an individual or group of individuals to join the organization, the firing of one or more individuals from the organization, a merger and acquisition event at the organization, or other significant company events, such as reorganizations, work force reduction, stock offerings, etc. In selected embodiments, the critical event detection step 804 automatically detects a risk assessment trigger event, such as the firing of an "influential" employee or the creation of a new side channel by the "influential" employee for communicating with other employees.

At step 805, the methodology proceeds to calculate or update a risk score for the user who performed the detected critical event. In an example embodiment, a risk assessment service in the contagion risk analytics service may be configured to assign a risk score to the user's behavior. In selected embodiments, the calculation of a risk score may use any suitable algorithm for analyzing a risk score or probability of an event or action by the user, including assigning a single or multivariant risk score on the basis of detected anomalous, abnormal, unexpected or malicious behavior. In selected embodiments, the risk score computation step 805 automatically a plurality of risk scores for a plurality of user events or actions.

At step 806, the methodology proceeds to propagate the user's risk score(s) to other users in the user contagion network who have connection relationships with the user. In an example embodiment, a risk assessment service in the contagion risk analytics service may be configured access the network relationship map 810 in order to evaluate the "influence" or contagion relationships between the user and other networked users, and then to assign risk scores to the other networked users on the basis of the "influence" or contagion relationships. For example, if a single or multivariant risk score is calculated for a first user, then the risk score propagation step 806 may identify one or more additional users who have a quantified "contagion" relationship with the first user based on the network relationship map 810. On the basis of the strength of the quantified "contagion" relationship, the risk score for the first user is propagated to the one or more additional users. For example, a scaling factor may be applied to the risk score for the first user to determine a scaled risk score for one or more additional users based on the strength of the quantified "contagion" relationship between the first user and the one or more additional users.

At steps 807-808, the methodology proceeds to automatically predict, protect and control user actions and/or data access based on the computed user risk scores. In an example embodiment, a risk adaptive protection and security service in the contagion risk analytics service may be configured continuously assesses risk and automatically provides proportional enforcement that can be dialed up or down. For example, a contagion behavior prediction service (step 807) may be used to predict the possibility of security risk events arising from joining business groups together prior to an M&A merger based on email analytics and/or other forensic data analysis. In addition or in the alternative, an isolation or control service (step 808) may be applied to adaptively apply a range of security countermeasures to address the identified risks. In selected embodiments, the processing at step 808 may automatically shape and enforce security policies across enterprise endpoints or devices, without requiring administrator intervention, to isolate and control bad behavior.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object-oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for protecting against contagion-based risk events, comprising:
monitoring behavior of a plurality of users and using a learning network structure to construct a contagion network relationship map of connection and influence relationships between different users in the plurality of users;
executing a discovery module for receiving and analyzing a stream of events from the plurality of users and using machine learning to identify a critical event performed by a first user having a first risk score;
executing a risk contagion module for generating, from the first risk score, one or more propagated risk scores for at least a first connected user in the plurality of users based on connection and influence relationships between the first user and the first connected user that are extracted from the contagion network relationship; and automatically generating an adaptive response to protect and control against actions by at least the first connected user based on the one or more propagated risk scores.

2. The method of claim 1, where monitoring behavior comprises monitoring electronic data and communications inputs comprising emails, instant messages, or other messaging communications from the plurality of users.

3. The method of claim 1, where monitoring behavior comprises monitoring electronic data and communications inputs from a Cloud Access Security Broker (CASB) which is configured to monitor and capture relationship information for the plurality of users.

4. The method of claim 1, where monitoring behavior comprises monitoring electronic data and communications inputs from a calendar application used by one or more of the plurality of users.

5. The method of claim 1, where monitoring behavior comprises monitoring one or more critical events associated with one or more of the plurality of users which are selected from a group consisting of employee hiring events, employee firing events, merger events, acquisition events, reorganization events, work force reduction event, and stock offering events.

6. The method of claim 1, where the contagion network relationship map is constructed based on specified measures of proximity between users in the plurality of users.

7. The method of claim 6, where the specified measures of proximity are one or more measures selected from the group consisting of physical proximity, network proximity, logical proximity, organizational proximity, and communication proximity.

8. The method of claim 1, where receiving and analyzing the stream of events comprises performing a risk assessment on each event in the stream of events to compute corresponding risk scores and identifying the critical event as a risk score meeting a minimum risk threshold requirement.

9. The method of claim 1, where generating the one or more propagated risk scores comprises assigning one or more contagion risk scores to at least a first connected user in the plurality of users based on connection and influence relationships between the first user and the first connected user that are extracted from the contagion network relationship.

10. The method of claim 1, where automatically generating the adaptive response comprises automatically preventing an identified user having a minimum propagated risk score from performing an event or action and/or otherwise dynamically protect data from access by the identified user.

11. A system comprising:
a processor; and
a non-transitory, computer-readable storage medium embodying computer program code and comprising instructions when executed by the processor are configured for:
monitoring behavior of a plurality of users and using a learning network structure to construct a contagion network relationship map of connection and influence relationships between different users in the plurality of users;
receiving and analyzing a stream of events from the plurality of users and using machine learning to identify a critical event performed by a first user having a first risk score;

generating, from the first risk score, one or more propagated risk scores for at least a first connected user in the plurality of users based on connection and influence relationships between the first user and the first connected user that are extracted from the contagion network relationship; and automatically generating an adaptive response to protect and control against actions by at least the first connected user based on the one or more propagated risk scores.

12. The system of claim 11, wherein the instructions are further configured to monitor behavior of the plurality of users by monitoring (1) electronic data and communications inputs comprising emails, instant messages, or other messaging communications from the plurality of users, (2) electronic data and communications inputs from a Cloud Access Security Broker (CASB) which is configured to monitor and capture relationship information for the plurality of users, (3) electronic data and communications inputs from a calendar application used by one or more of the plurality of users or (4) one or more critical events associated with one or more of the plurality of users which are selected from a group consisting of employee hiring events, employee firing events, merger events, acquisition events, reorganization events, work force reduction event, and stock offering events.

13. The system of claim 11, where the contagion network relationship map is constructed based on specified measures of proximity between users in the plurality of users.

14. The system of claim 13, where the specified measures of proximity are one or more measures selected from the group consisting of physical proximity, network proximity, logical proximity, organizational proximity, and communication proximity.

15. The system of claim 11, wherein the instructions are further configured to receive and analyze the stream of events by performing a risk assessment on each event in the stream of events to compute corresponding risk scores and identifying the critical event as a risk score meeting a minimum risk threshold requirement.

16. The system of claim 11, wherein the instructions are further configured to generate the one or more propagated risk scores by assigning one or more contagion risk scores to at least a first connected user in the plurality of users based on connection and influence relationships between the first user and the first connected user that are extracted from the contagion network relationship.

17. A non-transitory, computer-readable storage medium embodying computer program code comprising computer instructions which are executed by a processor and configured for:
monitoring behavior of a plurality of users and using a learning network structure to construct a contagion network relationship map of connection and influence relationships between different users in the plurality of users based on specified measures of proximity between users in the plurality of users, where the specified measures of proximity are one or more measures selected from the group consisting of physical proximity, network proximity, logical proximity, organizational proximity, and communication proximity;
receiving and analyzing a stream of events from the plurality of users and using machine learning to identify a critical event performed by a first user having a first risk score by performing a risk assessment on each event in the stream of events to compute corresponding risk scores and identifying the critical event as a risk score meeting a minimum risk threshold requirement;

generating, from the first risk score, one or more propagated risk scores for at least a first connected user in the plurality of users based on connection and influence relationships between the first user and the first connected user that are extracted from the contagion network relationship by assigning one or more contagion risk scores to at least a first connected user in the plurality of users based on connection and influence relationships between the first user and the first connected user that are extracted from the contagion network relationship; and automatically generating an adaptive response to protect and control against actions by at least the first connected user based on the one or more propagated risk scores by preventing an identified user having a minimum propagated risk score from performing an event or action and/or otherwise dynamically protect data from access by the identified user.

18. The non-transitory, computer-readable storage medium of claim 17, wherein the computer executable instructions are further configured to monitor behavior of the plurality of users by monitoring (1) electronic data and communications inputs comprising emails, instant messages, or other messaging communications from the plurality of users, (2) electronic data and communications inputs from a Cloud Access Security Broker (CASB) which is configured to monitor and capture relationship information for the plurality of users, (3) electronic data and communications inputs from a calendar application used by one or more of the plurality of users or (4) one or more critical events associated with one or more of the plurality of users which are selected from a group consisting of employee hiring events, employee firing events, merger events, acquisition events, reorganization events, work force reduction event, and stock offering events.

* * * * *